United States Patent
Fierro et al.

(10) Patent No.: US 6,549,857 B2
(45) Date of Patent: Apr. 15, 2003

(54) METHODS FOR DETECTING LEAKS IN PRESSURIZED PIPING WITH A PRESSURE MEASUREMENT SYSTEM

(75) Inventors: Michael R. Fierro, Sunnyvale, CA (US); Joseph W. Maresca, Jr., Sunnyvale, CA (US)

(73) Assignee: Vista Research, Inc., Sunnyvale, CA (US)

(*) Notice: Subject to any disclaimer, the term of this patent is extended or adjusted under 35 U.S.C. 154(b) by 0 days.

(21) Appl. No.: 09/847,944

(22) Filed: May 2, 2001

(65) Prior Publication Data

US 2002/0120411 A1 Aug. 29, 2002

Related U.S. Application Data

(60) Provisional application No. 60/201,164, filed on May 2, 2000.

(51) Int. Cl.$^7$ .............................................. G01F 23/14
(52) U.S. Cl. ........................................ 702/51; 702/138
(58) Field of Search .......................... 73/40.5 R, 49.1, 73/49.2; 364/509; 702/35, 36, 50, 51, 138, 140

(56) References Cited

U.S. PATENT DOCUMENTS

| | | | |
|---|---|---|---|
| 4,404,843 A | * 9/1983 | Johnson et al. | 73/49.2 |
| 4,608,857 A | 9/1986 | Mertens et al. | 73/40.5 R |
| 4,852,054 A | * 7/1989 | Mastandrea | 364/509 |
| 5,078,006 A | 1/1992 | Maresca, Jr. et al. | 73/405 R |
| 5,090,234 A | * 2/1992 | Maresca, Jr. et al. | 73/49.1 |
| 5,163,314 A | * 11/1992 | Maresca, Jr. et al. | 73/40.5 R |
| 5,170,657 A | * 12/1992 | Maresca, Jr. et al. | 73/40.5 R |
| 5,189,904 A | * 3/1993 | Maresca, Jr. et al. | 73/40.5 R |
| 5,201,212 A | * 4/1993 | Williams | 73/40.5 R |
| 5,272,646 A | 12/1993 | Farmer | 364/509 |
| 5,361,622 A | 11/1994 | Wall | 73/49.2 |
| 5,375,455 A | * 12/1994 | Maresca, Jr. et al. | 73/40.5 R |
| 5,415,003 A | * 5/1995 | Maresca, Jr. et al. | 73/40.5 R |
| 5,610,323 A | 3/1997 | Ashworth | 73/40.5 R |
| 5,883,815 A | * 3/1999 | Drakulich et al. | 364/509 |
| 5,948,969 A | 9/1999 | Fierro et al. | 73/40.5 R |
| 6,082,182 A | 7/2000 | Fierro et al. | 73/40.5 |
| 6,244,100 B1 | 6/2001 | Hastings et al. | 73/49.1 |

OTHER PUBLICATIONS

Wang, G; Dong, D; Fang, C; "Leak Detection For Transport Pipelines Based On Autoregressive Modeling"; IEEE Transactions on Instrumentation and Measurement; vol. 42 Issue No. 1; 1993; pp 68–71.*

Brodetsky, I; Savic, M; "Leak Monitoring System For Gas Pipelines"; IEEE International Conference on Acoustics, Speech and Signal Processing; vol. 3; 1993; pp 17–20.*

Wang, G Z; Fang, C Z; Wang, K F; "State Estimation And Leak Detection And Location In Pipeline"; Proceedings IECO International Conference on Industrial Electronics, Control and Instrumentation; vol. 3, 1991; pp 155–160.*

Watanabe, K; Koyama, H; Tanoguchi, H; Ohma, T; "Pinhole Location In A Pipeline";Proceedings IECO International Conference on Industrial Electronics, Control and Instrumentation; vol. 3; 1991; pp 2516–2521.*

Sandberg, C; Holmes, J; McCoy, K; Koppitsch, H; "The Application Of A Continuous Leak Detection System To Pipelines And Associated Equipment"; IEEE Transactions on Industry Applications; vol. 25 Issue 5; 1989; pp 906–909.*

Benkherouf, A; Allidina, A y;"Leak Detection And Location In Gas Pipelines"; IEEE Proceedings on Control Theory and Applications; vol. 135 Issue 2; 1988; pp 142–148.*

* cited by examiner

Primary Examiner—Kamini Shah
Assistant Examiner—Douglas N Washburn
(74) Attorney, Agent, or Firm—David Jaffer; Pillsbury Winthrop LLP

(57) ABSTRACT

A method of detecting a leak in a pressurized pipeline system, in which a measurement is performed to determine the difference in the rate of change of pressure due to a leak between one pressure level and at least one other pressure level, after compensation has been made for thermally induced changes in the pressure.

55 Claims, 9 Drawing Sheets

METHODS FOR DETECTING LEAKS IN PRESSURIZED PIPING WITH A PRESSURE MEASUREMENT SYSTEM

This application claims priority from U.S. Provisional Patent Application Ser. No. 60/201,164, filed May 2, 2000.

BACKGROUND OF THE INVENTION

1. Field of the Invention

The present invention relates to methods for accurate and reliable detection of leaks in pressurized pipe systems containing a liquid such as water, petroleum fuels and products, and other hazardous and non-hazardous substances, and more particularly to a method achieving high performance due to accurate compensation of product temperature changes that occur during a test.

2. Brief Discussion of Prior Art

There are a number of different types of pressure-based methods that are used to detect leaks in underground pressurized pipelines containing petroleum fuel or any type of liquid. A loss of liquid from the line due to a leak will produce a drop in pressure. A leak is declared if the pressure drop exceeds a predetermined threshold value. The magnitude of the pressure drop due to a leak is a function of and proportional to the volume of the liquid in the line, the bulk modulus of the pipeline system, and the initial pressure of the line. Thus, the pressure drop is larger in a smaller line than in a larger line for the same size leak. This is important because the pressure changes due to product temperature changes are independent of line volume.

Conventional Pressure Test

The most common type of pressure test is a pressure-decay or hydrostatic test. The method is to isolate the line to be tested from tanks or other line segments connected to it by valves or valve blinds, fill the line with a liquid or use the existing liquid in the line, pressurize the line, and then monitor the pressure changes over time. This pressure testing method is used for evaluating the structural integrity of a pipe. The main applications of the method are in transportation and transmission pipelines. Because of the inherent errors in this type of test, such a test was not originally intended to be used for leak detection.

Erroneous results occur in a pressure test if (a) any vapor is trapped in the line (or appurtenances attached to the line) or (b) the temperature of the fuel changes during a test. While both effects are acknowledged in the test procedure, no methods are offered to compensate for their effects. Also, the method described in these standards does not indicate what threshold to use to declare that the line is leaking, i.e., how large a pressure drop is required before the line is suspected of leaking. Over the years this method has been frequently applied to a wide range of pipelines, both small and large, but without much success for detecting small leaks.

Ambient Product Temperature Changes

One reason that this approach has not been successful is that a drop or rise in pressure can also occur if the temperature of the fuel (or liquid in the line) is also changing. An increase in temperature will cause the pressure in the line to increase. If these thermally induced pressure changes are large, they can mask the presence of a leak and result in a missed detection. A decrease in temperature will cause the pressure in the line to decrease. If these thermally induced pressure changes are large, they can falsely indicate the presence of a leak and result in a false alarm.

Underground petroleum fuel lines can experience large, nonlinear temperature changes, which produce large, thermally induced pressure changes, because the coefficient of thermal expansion for petroleum fuels is large and the temperature of the product brought into the line can be very different than the temperature of the fuel in the line or the ground surrounding the line. A new temperature condition is generated any time fuel from a storage tank is transferred through a pipe.

FIG. 1($a$) is a time series showing the typical thermal behavior of product brought into a line at a warmer temperature than the backfill and soil surrounding the line; FIG. 1($b$) shows the time series of the rate of change of temperature. The thermally induced pressure changes are proportional to temperature changes, and scale according to the bulk modulus (compressibility) of the line and the coefficient of thermal of expansion of the liquid in the line. The volume of product in the line affects the rate of change of the temperature in the line. Thus, the two time series in FIG. 1 also illustrate the thermally induced pressure changes that occur in the line. In the present disclosure, this type of product temperature and line pressure change will be referred to as an ambient thermal change to distinguish it from product temperature and line pressure changes produced by changing the pressure in the line.

The observed curvature in both the temperature (and the pressure) and the rate of change of temperature (or the rate of change of pressure) curves in FIG. 1 clearly illustrate the nonlinear changes in product temperature that occur during a test. When high performance is desired, testing with conventional pressure-decay methods, which do not compensate directly for the product temperature changes, cannot be initiated until the rate of change of temperature is sufficiently small that the thermally induced pressure changes are negligible. This means that the line must be taken out of service for whatever length of time is necessary to reach this stage of negligible thermal changes. Small pipelines at retail service stations may require a waiting period of 2 to 12 h. The larger lines at bulk fuel storage facilities may require a waiting period of 12 to 36 h, and the larger lines found in airport hydrant systems may require a waiting period of many days or longer.

This approach for minimizing the impact of fuel temperature changes with a waiting period has adverse operational and performance implications. First, transfer operations may need to cease for an unacceptably long period of time. Second, there is no way to guarantee that a presumably adequate waiting period is in fact sufficiently long for thermal changes to dissipate. Third, even if the waiting period is adequate, there is no way to verify quantitatively that the rate of thermal change is negligible or to verify that product temperature has not changed in response to other heat sources and sinks (e.g., heating or cooling of a section of an underground pipe that is exposed to sun or clouds).

The use of a waiting period to minimize the thermally induced errors in a pressure test is only practical for use on pipelines with small diameters or small capacities, such as those found at petroleum fuel service stations. Even for these pipelines, this approach has had only limited success. The use of a waiting period is also not useful if quick tests are to be conducted. The use of a waiting period is not practical for large diameter or large capacity lines found at bulk fueling facilities, in airport hydrant systems, or in transportation or transmission pipelines, because it could take many days or longer for the thermal changes to become negligible.

For these larger pipelines, accurate leak-detection tests can only be performed if the thermally induced pressure changes are compensated for. One compensation approach is to measure the temperature changes of the fuel in the line, estimate by standard hydraulic computations the magnitude of the pressure changes produced by these temperature changes, and then subtract these thermally induced pressure changes from the measured pressure changes. If the temperature compensation is accurate, then only the leak-induced pressure changes remain.

This temperature-compensation approach to performing a pressure test has a number of serious technical and implementation problems. First, it is very difficult to obtain accurate measurements of the fuel temperature changes along the length of the pipe. These measurements are necessary to account for any differences in the temperature conditions along the length of the line. Typically, no more than one temperature sensor is used, even though the pipe may be many miles in length and may be affected by many different thermal environments. Second, the bulk modulus and volume of the product in the line must be accurately known.

Trapped Vapor

The presence of trapped vapor or any appurtenance (like a surge suppressor) that may change the compressibility of the line as the pressure in the line changes can lead to a test result that is impossible to interpret. As the volume of trapped vapor in a line increases, the magnitude of the pressure change that occurs due to a given leak or product temperature change decreases. The pressure changes from large leaks can be reduced to undetectable levels because of small amounts of vapor in the line. The presence of vapor, which is difficult to quantify in terms of its volume, makes the results of pressure tests totally ambiguous, because the pressure drop can range from a very small value to a very large value for the same size leak and same initial test pressure.

FIGS. 2 and 3 show the difference in the pressure drop with and without trapped vapor in a 3,133-gal line and 12,500-gal line produced by a very modest temperature change over a 1-hour period and a 4-hour period. These differences occur even if the thermally induced pressure changes due to the ambient temperature changes are compensated for. If trapped vapor or surge suppressors are present in the line and the volume of the trapped vapor is not known, then pressure tests become highly inaccurate and should not be used.

Pressure induced temperature changes also seriously degrade the performance of a pressure test is produced any time the pressure in the line is changed. A "small" temperature change is associated with any pressure change. This temperature change produces a perturbation in and affects the rate of change of the underlying ambient product temperature field.

FIG. 4(a) illustrates pressure change as a function of time, and FIG. 4(b) shows a corresponding (exaggerated) pressure-induced thermal perturbation resulting from increasing and decreasing the pressure in the line. The underlying ambient product temperature as it would have been had there been no pressure change is shown by the dashed line. These pressure-induced product temperature changes, which may be several hundredths to several tenths of a degree Centigrade, occur because the pressure change compresses the liquid or causes it to expand. This effect is even larger if there is trapped vapor in the line, or if the line and appurtenance on the line are more compressible than the liquid in the line. Once a temperature perturbation is induced, the change in temperature over time is controlled by the difference in temperature between the fuel in the line and the surroundings. This means that the pressure changes that occur are not independent but are coupled with the ambient changes.

These thermal perturbations in temperature may take tens of minutes or longer to come into equilibrium with the underlying ambient product temperature field. The magnitude of the temperature perturbation at a given point in time is dependent on the magnitude of the pressure change, the time that elapses between the pressure change and the measurement period, the volume of product in the pipe system, and the system characteristics that control the rate of change of temperature of the product in the pipe (e.g., pipe diameter and pipe wall material, type of product in the pipe, and the type, characteristics, and condition of the backfill and soil surrounding the pipe). In many instances, after tens of minutes, the rate of change of temperature caused by these anomalous phenomena is too small to measure with most common temperature measurement sensing systems.

Two-Pressure Test

In U.S. Pat. No. 4,608,857, Mertens describes a pressure test method for compensating for fuel temperature changes during a pressure test without directly measuring the temperature changes in the line. This test is conducted using a test comprised of three measurement segments and two different pressure levels. As shown in FIG. 5(a), the initial pressure levels of the first and third measurement segments are the same (denoted by the dot) and the initial pressure level of the second measurement segment is different (denoted by the dot). The pressure changes (or rate of change of pressure) from the first and third measurement periods are then averaged and subtracted from the pressure changes (rate of change of pressure) measured during the second measurement period to obtain a temperature-compensated pressure change (rate of change of pressure). This compensated pressure change difference is then compared to a threshold to determine whether or not a leak is present; the threshold is referred to in Mertens as the "time standard allowed pressure change difference value." Mertens states that "the influences of changes in temperature on the pressure curve is almost completely eliminated." This assertion is only true if the second derivative of the unperturbed pressure field is zero or very nearly zero. Using the analytical assumption that the second derivative of the pressure field is zero is a useful approximation only over a very short time period (less than 20 minutes). Tests that use data taken over a longer period of time must take into account the non-zero nature of the second derivative.

Mertens describes a two pressure, two measurement segment pressure test method for compensating for fuel temperature changes, but this method requires the unrealistic assumption that the pressure changes are linear during a test. If the fuel temperature changes can be assumed to be linear, then the thermally induced pressure changes can be compensated by subtracting the rate of change of pressure during the first measurement segment with the rate of change of pressure during the second measurement segment. Since the fuel temperature changes are not linear, this approach is unreliable and will not work if small leaks are to be detected.

The pressure-induced thermal perturbations produce a systematic error, or bias, in the temperature-compensated rate of change of pressure computed from the pressure data using either of these two methods described by Mertens. For a given liquid product, the magnitude of this systematic error depends on the difference between the low and high pressures used to conduct a test, the time that elapses between any pressure changes and the subsequent measurement periods, and the volume of product in the line. If the liquid product in the line changes, then the magnitude of the systematic error also depends on the magnitude of the coefficient of thermal expansion of the liquid and the bulk modulus of the liquid. Whether or not this systematic error can be tolerated during a test depends on the performance desired of the system (i.e., the smallest leak to be detected). If it cannot be tolerated, then an estimate of this systematic bias needs to be minimized or measured, and removed.

Mertens describes this effect as creep and claims that this pressure change has a time constant of about 0.5 to 1 h and states that if a quick test is to be conducted, then this pressure change due to creeping must be compensated for, because it can produce a pressure change identical to a leak.

This systematic error or creep is compensated for by Mertens using a calibration procedure. In a short test, the magnitude of this thermal effect may be 2 to 10 times larger than the magnitude of the leak to be detected. In order to compensate for an effect of this magnitude, the calibration must be conducted with great accuracy. Mertens describes a compensation process in which an "empirical constant" that is dependent upon the difference between the initial pressures of the two test pressures is determined from measurements on the line to be tested, when it is known to be leak free and then used to adjust (reduce) the measured pressure difference obtained during a test. As a consequence, the method taught by Mertens is mainly useful for implementation on new pipelines where the integrity of the line is known initially or on an existing line previously tested by another leak detection method. This limits the application of this methodology for leak detection, because the integrity of most of the lines that need to be tested for leaks, by definition, is of course unknown.

Mertens recognizes that this creeping pressure change is a function of the bulk modulus (i.e., compressibility) of the line, the magnitude of the temperature change, and the coefficient of thermal expansion of the product in the line. However, he did not recognize that this pressure change will impose a nonlinear, time-dependent change of pressure and that the magnitude of the change is also a function of the difference in temperature between the fuel and the surroundings (e.g., ground) and the spatial temperature distribution in the surrounding environment and the line. The rate of change of temperature and therefore, the rate of change of pressure can be different, even for the same initial temperature difference, depending on the spatial distribution of temperature in the ground. The temperature conditions in the ground are highly dependent on the transfer history of the fuel.

The systematic error or creep can be minimized by a variety of other approaches besides calibration on the line to be tested. The magnitude of the systematic error can be reduced by reducing the magnitude of the pressure difference used in testing the line or by increasing the time between any pressure change and the subsequent measurement period. Each of these approaches has a number of drawbacks that can impact the performance of the method or its application to the particular line to be tested.

Since the method described measures the difference in the rate of leakage at two different pressures, reducing the magnitude of the pressure change reduces the magnitude of the signal that is to be detected in addition to reducing the noise (or 'creep'). Since the magnitude of the signal decreases faster than the magnitude of the noise, the performance of the method is degraded under these circumstances. Also, reducing the magnitude of the pressure change is not always possible if the line must be tested at a prescribed pressure or if the pressure difference is not sufficient to detect the leak rate of interest.

Increasing the interval between any pressure change and the subsequent measurement period is an effective means of addressing the adverse effects of the perturbation, because these temperature changes decrease with time. However, if the duration of the test becomes too long, the accuracy with which the methods described above compensate for the ambient thermally induced volume changes is degraded. This is because the rate of change of temperature does not decrease linearly over long periods of time. Thus, for optimal performance, a balance must be found between the length of the intervals (between the measurement periods and the pressure changes) and the total length of the test.

The maximum-size line that can be tested with the methods taught by Mertens will depend on the performance requirements, the pressure difference, and the time between the pressure changes and the measurement periods and line volume.

For accurate leak detection tests, accurate compensation of the thermally induced pressure changes that occur during a test is required (1) because the fuel in the line is different than the surrounding environment and (2) because of creeping in the line produced by changing the pressure during a test. The methods used by Mertens to compensate for both of these effects greatly limit the application of the method. First, the higher-order nonlinear thermally induced pressure changes, whether they are caused by differences in temperature between the fuel and the environment (ground) or by creeping, can produce large enough errors to prevent this method from finding small leaks. Mertens methodology does not recognize that creeping is also a source of nonlinear temperature changes. Second, the so-called creeping that occurs in a line over a time interval is a very large and important source of error in the method described by Mertens, because of the large time required to perform the Mertens' method due to the need to change the pressure three times to complete a test.

SUMMARY OF THE INVENTION

It is therefore an object of the present invention to provide a method for reliable and accurate detection of leaks in pressurized pipe systems containing liquids, including water, petroleum products, and hazardous and nonhazardous substances.

It is another object of the present invention to provide a method of compensating for the thermal expansion and contraction of a product in a pipe and of the pipe itself.

A further object of the present invention is to provide a method of estimating the error in compensating for the thermal expansion and contraction of the product in the pipe and of the pipe itself.

A still further object of the present invention is to provide a method for detection of leaks in a pressurized pipe system containing liquids that is designed to work well when the rate of change of product temperature is nonlinear.

Yet another object of the present invention is to provide a method for the detection of leaks in pressurized pipelines containing liquids that is designed to minimize the effects of pressure-induced thermal perturbations to the ambient product temperature field.

A further object of the present invention is to provide a method for testing a pressurized pipe system for leaks by collecting and analyzing data at a minimum of two pressures and with as few as two measurement periods.

Another object of the present invention is to provide a method that can be used to test pipe systems for leaks without the use of any a priori calibration or empirical data on analytical or empirical models for, or general knowledge about, the status of the pipe system to be tested or other similar pipe systems when in a nonleaking condition.

Briefly, a preferred embodiment of the present invention includes a method of detecting a leak in a pipeline systems, wherein a measurement is preferred to determine the difference in the rate of change of pressure due to a leak between one pressure level and at least one other pressure level, after compensation has been made for thermally induced changes in the pressure in a pressurized pipeline system, including the steps of pressurizing the pipeline system to a first pressure level, and measuring the changes in pressure in the pipeline system that occur over a first measurement period, and pressurizing the pipeline system to at least a second pressure level, and measuring the changes in pressure in the pipeline system that occur over at least a second measurement period. A computation is then performed of the difference in the temperature compensated rate of change of pressure between one pressure level and at least one other pressure level from the measured pressure data at the pressure levels, including a correction for the thermally induced non-linear changes of pressure between the measurement periods, wherein the difference in the temperature compensated rate of change of pressure between the pressure levels is computed from the rate of change of pressure measured during the measurement periods (first derivative of the pressure data or rate of change of pressure) and higher order derivatives of the pressure data.

BRIEF DESCRIPTION OF THE DRAWINGS

FIG. 4 is an example of thermal changes in the product in a pipe system given the same variables described in FIG. 1 (where product is added whose temperature differs from that of the surrounding backfill and soil) but with the additional variable that pressure is increased and decreased as it is during a leak detection test;

DESCRIPTION OF THE PREFERRED EMBODIMENT

Figure 6:
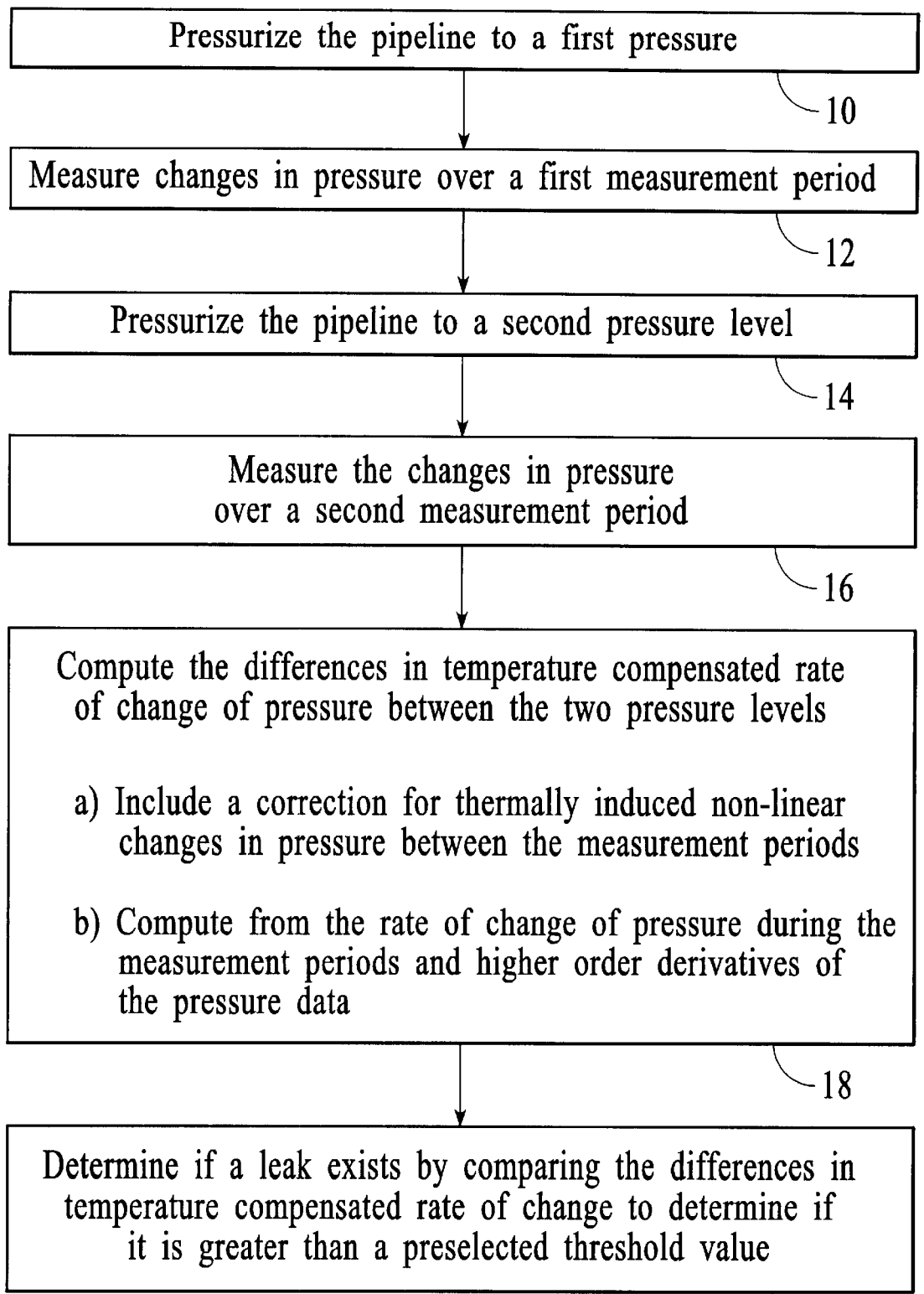
FIG. 6 is a flow chart of the method of the present invention.
Figure 8A:
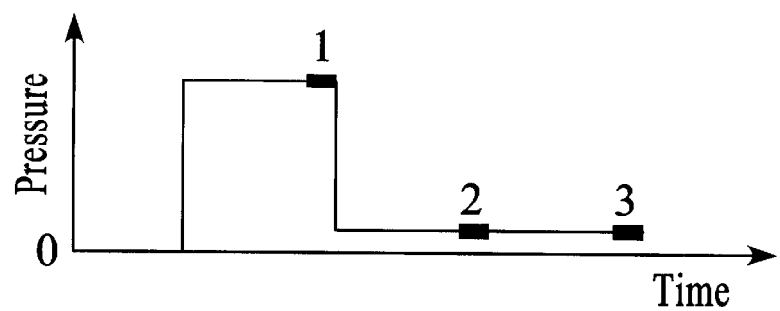
FIG. 8(a) illustrates a three-segment data collection scheme for conducting a leak detection test with only two pressure changes.
Figure 8B:
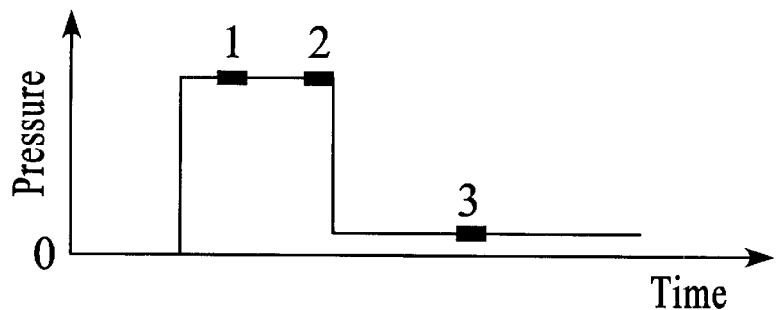
FIG. 8(b) illustrates another three-segment data collection scheme for conducting a leak detection test with only two pressure changes.
Figure 8C:
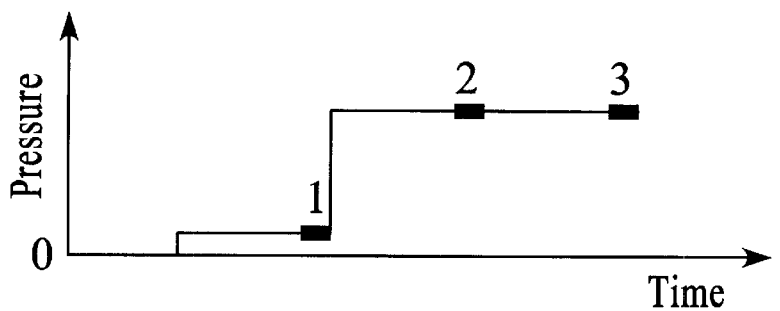
FIG. 8(c) illustrates another three-segment data collection scheme for conducting a leak detection test with only two pressure changes.
Figure 8D:
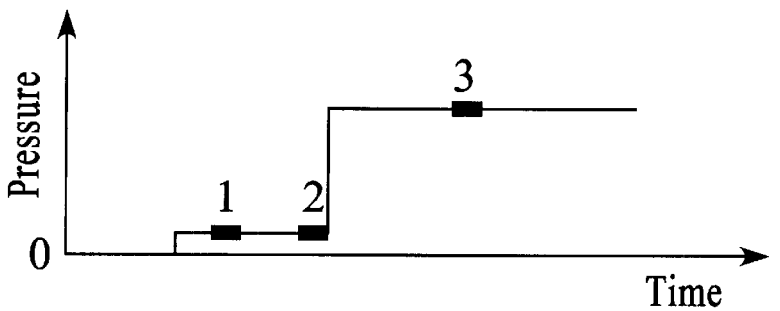
FIG. 8(d) illustrates another three-segment data collection scheme for conducting a leak detection test with only two pressure changes.

Referring now to FIG. 6, the method of the present invention is briefly described in a flow chart. The method begins by pressurizing the pipeline to be tested to a first pressure level (block 10) through a test port. Without any further additions or extractions of gas from the line, the pressure in the pipeline is monitored over a first measurement period (block 12). The pipeline is then pressurized to a second pressure level (block 14), and the procedure of pressure monitoring is repeated for a second interval of time (block 16).

Block 18 of FIG. 6 summarizes an involved computation that will be fully explained in the following text of the specification. The method requires the computation of the difference in temperature compensated rate of change of pressure between at least two pressure levels, i.e., from the data taken at the two pressure levels of blocks 10 and 14. The computation includes a correction for thermally induced non-linear changes of pressure between the measurement periods (Block 18a). As indicated in block 18 part b, the computation of the difference in temperature compensated rate of change involves first calculating the rate of change of pressure during the measurement periods and higher order derivatives of the pressure data. The calculated difference in temperature compensated rate of change of pressure is then compared with a predetermined reference. If the calculated rate of change is greater than the threshold, a leak is indicated (block 20).

The method of the present invention is an improvement over that provided by Mertens for reasons including the following:

1. The number of pressure changes required to implement the method of the present invention is reduced to two without compromising the accuracy of the temperature compensation.
2. The accuracy of the method is measured as part of the test.
3. The interval between any pressure change and any subsequent measurement period is increased, thereby reducing the effect of the thermal perturbation associated with that pressure change.
4. Non-linear changes in ambient product temperature that become significant when the interval is increased are compensated for in such a way that the accuracy of the overall thermal compensation scheme is not affected by the duration of the test.

With the fourth improvement listed above, the calibration requirement is eliminated or reduced to the point where an analytical model or generalized database can predict the effects of perturbation with sufficient accuracy to allow the detection of small leaks. This later improvement is accomplished because the method of the present invention compensates for the non-linear thermally induced pressure changes that occur using a two pressure, two measurement period method that compensates for non-linear temperature induced fuel changes and that performs better than the three pressure step method of Mertens because it addresses changes in which the second derivatives of pressure is not zero. With the calibration requirement eliminated, the method is used for tightness testing (a single test on a line whose integrity is not known) or retrofitted to a line whose integrity is known. High performance is obtained because of the better temperature compensation achieved with the method of the present invention.

The method of the present invention is designed to detect small leaks in pipe systems that contain any type of liquid product and that are either pressurized or can be placed under pressure for the duration of a test. The method requires that the line undergo a leak detection test while its liquid contents are at rest, i.e. no flow in the line. The method is particularly useful in underground or underwater pipe systems, but can also be used on pipe systems located above ground, such as those found in buildings or placed in specialized containment systems. Because the device will compensate for thermally induced changes in the pressure of the product during a test, it is particularly useful for liquids that have a high coefficient of thermal expansion compared to water. The major application of the method is for the detection and quantification of the flow rate produced by a leak in underground pressurized pipe systems containing petroleum products.

The method of the present invention improves upon the performance of the previous methods described in U.S. Pat. No. 4,608,857 by more accurately compensating for the product temperature conditions in the line without requiring three pressure changes during a test. The method of the present invention works under a wide range of ambient and operational product temperature conditions, including conditions when the ambient product temperature changes are highly nonlinear and the ambient product temperature field contains pressure-induced thermal perturbations and/or other thermal anomalies. The use of higher-order derivatives allows accurate results to be obtained even when the product temperature field is highly nonlinear, i.e., when the rate of change of product temperature is nonlinear.

The preferred embodiment of the method of the present invention permits the pressure data to be collected during only two measurement periods, one at each of two different pressures. The first and second derivatives of the pressure data are computed and then used to compensate for the thermally induced product pressure changes during the test. If a leak is present, the test result is a measure of the difference in the rate of change of pressure due to a leak at the two pressures.

The use of higher-order derivatives further allows for greater separation between the perturbations introduced by the pressure change and the measurement periods without degrading the performance of the temperature compensation scheme. Maximizing the separation time between measurement periods and the pressure-change-induced thermal perturbations is an important way to reduce the effect of these perturbations on the test result. By reducing the magnitude of the effect in this way, the requirement for calibration can be eliminated or relaxed such that a prior data collected on the pipe system being tested is not required.

The method of the present invention will now be described in detail in the following text and in reference to the figures of the drawing.

In order to measure the pressure changes that are due to a leak, it is necessary to compensate for the temperature-induced pressure changes of the product in a pipe system. The present invention compensates for these thermally induced pressure changes and improves upon the two-pressure, three-measurement-segment method described in U.S. Pat. No. 4,608,857.

Figure 5A:
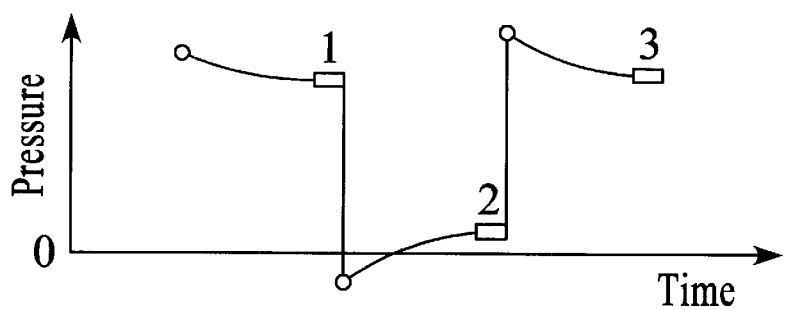
FIG. 5(a) illustrates a three-segment data collection scheme for conducting a leak detection test where the pressure is the same in the first and third measurement segments.
Figure 5B:
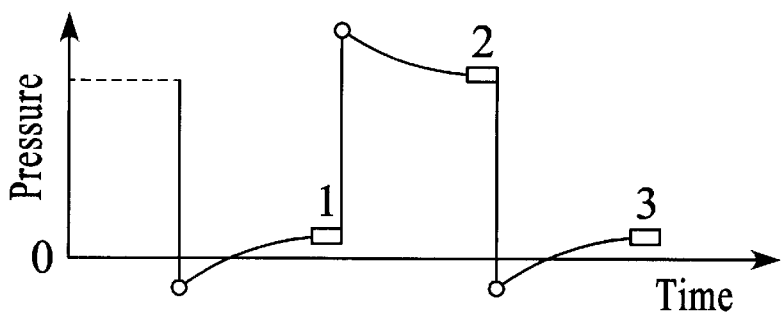
FIG. 5(b) illustrates another three-segment data collection scheme for conducting a leak detection test where the pressure is the same in the first and third measurement segments.
Figure 7A:
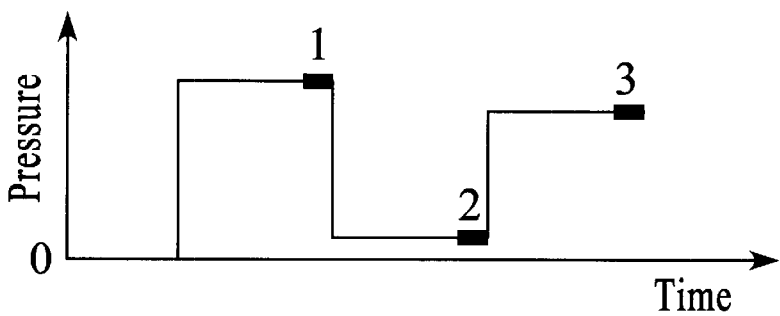
FIG. 7(a) illustrates a three-segment data collection scheme for conducting a leak detection test when the pressure is different in all of the measurement segments.
Figure 7B:
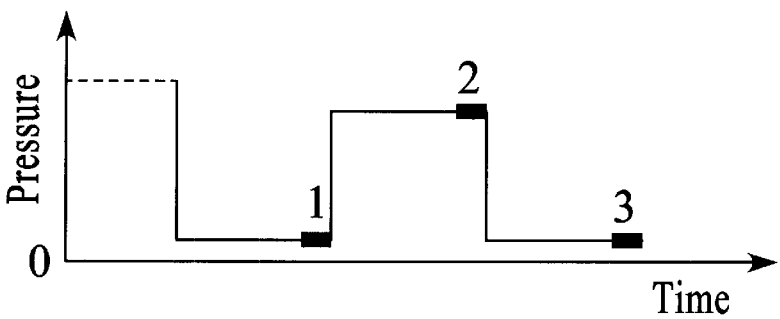
FIG. 7(b) illustrates another three-segment data collection scheme for conducting a leak detection test when the pressure is different in all of the measurement segments.

The method for computing the difference in the temperature-compensated rate of change of pressure, TCPR, between two pressures, $P_1$ and $P_2$, during a leak detection test is described in U.S. Pat. No. 4,608,857 and is given by $$TCPR(P_1-P_2,t_2)=[(PR_1(P_1,t_1)+PR_3(P_3,t_3))/2]-PR_2(P_2,t_2) \quad (1)$$

where the rate of change of pressure, or pressure rate ($PR_1$, $PR_2$, and $PR_3$) is measured during each of three measurement periods (as denoted by the indices 1, 2 and 3), and where the pressures $P_1$ and $P_3$ are equal and are different than $P_2$. This method, illustrated in FIGS. 5(a) and 5(b), can be immediately improved by not placing any restrictions on any of the pressures of the three measurement segments. Thus, Eq. (1) becomes $$TCPR(P_{wt\ avg}-P_2,t_2)=[(PR_1(P_1,t_1)+PR_3(P_3,t_3))/2]-PR_2(P_2,t_2) \quad (2)$$

where $P_{wt\ avg}$ is the weighted average of the pressures of the first and third measurement segments. This measurement method is illustrated in FIGS. 7a and 7b. If a leak is present, the measured rate of change of pressure, PR, will include for any measurements made at a nonzero pressure, the volume contributions from both the leak and the thermally induced pressure changes. TCPR is computed from the difference in the average rate of change of pressure estimated from the measured pressure rates in measurement periods 1 and 3 and the pressure rate measured during measurement period 2. If no leak is present, then TCPR will be equal to zero, i.e. $(PR_1+PR_3)/2=PR_2$. Any residual pressure change that exists is due primarily to the error in temperature compensation. If a leak is present, then TCPR will be equal to the difference in the rate of change of pressure due to the leak rates that would be measured at $P_2$ and $P_{wt\ avg}$. Both statements are true if the effects of the pressure-induced thermal perturbations are negligible.

$P_{wt\ avg}$ is the pressure at which the flow rate due to a leak is equal to the average flow rate due only to the leak at pressures $P_1$ and $P_3$, i.e., $LR(P_{wt\ avg})=[LR_1(P_1)+LR_3(P_3)]/2$, where the leak rate, LR, is the flow rate due to the leak at the designated pressure. In general, it will not be possible to determine $P_{wt\ avg}$ without using a model that describes how the leak rate changes with pressure or without additional measurements to quantify this relationship.

For most testing applications, two of the pressures are equal (e.g., FIGS. 8a–8d). The accuracy of the three-segment methods improves dramatically when it is implemented using the same pressure in either the first two or the last two measurement segments ($P_1=P_2$ or $P_2=P_3$). This reduces the thermal error induced by the pressure change. The reduced number of pressure changes makes the method better suited for certain applications and better able to accommodate some important operational constraints that may be placed on a test. Some examples include: (1) when pressure transients occur each time the pressure is changed, as is the case when testing large pipelines (or pipelines that operate at higher pressures); (2) when the storage, handling, or disposal of product, which necessarily occur when pressure is changed, is difficult; and (3) for simplification of the test protocol when a manual or semi-automatic implementation of the test methodology is used. The pressure sequence may be high-low-low, high-high-low, low-high-high or low-low-high, as illustrated in FIGS. 8a–8d respectively.

A manual or a semi-automatic implementation of the two-pressure, three-segment test using a high-low-low or low-high-high) sequence is attractive for underground pipelines associated with underground storage tank (UST) and aboveground storage tank (AST) facilities that dispense petroleum with a pump, where in order to change pressure in the line one must normally have control of the dispensing pump. In this application, the leak testing apparatus can be attached to the line at a valve connection located at or near the fuel dispensing pump. When this pump is turned on, which can be done manually, the line is pressurized. For example, this is easily done using the pump handle on a dispenser at a retail motor fuel service station. A high-low-low test can be initiated once the pump is turned off. The decreasing pressure levels required for the second and third segments can be attained by removing product from the line. This can be done automatically or manually by an operator. Once this has been accomplished, the test can be completed without any further pressure changes. No further access to the fuel dispensing pump is required, a factor that has cost, safety, and operational benefits. This approach is particularly amenable to portable and/or battery operated implementations.

As described below, an estimate of the error of thermal compensation can also be determined by applying Eqs. (1) or (2) when all three pressures are the same. Since the flow rate due to a leak would be the same in each segment, any non-zero pressure change would be due mainly to the error in compensation. If the error is substantial, especially in comparison to the estimated TCPR, the test should be considered invalid and should be repeated. This method can be implemented operationally by adding a fourth measurement segment to the method, either prior to or after completing the test described by Eqs. (1) or (2). This same approach can be used during a two measure segment test using the improved temperature compensation algorithm.

As described in the above discussion of the prior art regarding the "Conventional Pressure Test," Eq. (2) can be interpreted as the difference between (a) the estimated pressure change for measurement period 2, $PR_{2\ est}$, at time $t_2$ and pressure $P_{wt\ avg}$, and (b) the measured pressure change for measurement period 2, $PR_{2\ meas}$, at time $t_2$ and pressure $P_2$. This is given by $$TCPR(P_{wt\ avg}-P_2,t_2)=PR_2(P_{wt\ avg},t_2)_{est}-PR_2(P_2,t_2)_{meas} \qquad (3)$$

If a leak is present, then $PR_{2\ est}$ will be different from $PR_{2\ meas}$ by the incremental pressure change produced by the volume change due to the leak between $P_{wt\ avg}$ and $P_2$, i.e., $PR_{2\ est}-PR_{2\ meas}=PLR(P_{wt\ avg})-PLR(P_2)$. If not, then $PR_{2\ est}=PR_{2\ meas}$. (This is not strictly true, because there may be small differences in the pressure change that is required to estimate the rate of change of pressure.) In the methods previously presented by Mertens, the estimate of $PR_2$ was made from measurements of the rate of change of pressure ($PR_1$ and $PR_3$) during the first and third measurement periods, where the pressures were equal.

Conducting a Leak Detection Test Utilizing the Higher-Order Characteristics of the Pressure Data There are other ways, however, to determine $PR_{2\ est}$ at time $t_2$ and pressure $P_{wt\ avg}$ that are more accurate than simply averaging the pressure changes in the bracketing measurement periods. First, it is not necessary to use the bracketing measurement periods to make such an estimate. Second, it is not necessary to use three measurement periods to conduct a test. Third, there are better ways to account for the nonlinear changes in the estimate of the pressure change at time $t_2$ than averaging the pressure changes in the bracketing measurement periods. Thus, any method of estimating $PR_2(P_{wt\ avg},t_2)_{est}$ that accurately accounts for the nonlinear product temperature changes can also be used.

Interpretation of the methods described in U.S. Pat. No. 4,608,857 as differencing methods, as illustrated by Eq. (3), allows for generalization of these methods and for operational and performance improvements to be made to them. The method of the present invention used to collect and analyze the pressure data during a leak detection test requires that (1) a test be conducted at two pressures
(2) a measurement of the rate of change of pressure be made during a measurement period at one pressure
(3) an estimate of the rate of change of pressure during that measurement period be made using pressure data obtained at a different pressure and an estimate of the second (and/or higher-order) derivative of the pressure data describing the thermally induced pressure changes that occur between the measurement periods
(4) the temperature-compensated rate of change of pressure, or pressure rate, be computed from the difference of the pressure changes determined in steps (3) and (4)

Better performance is achieved with this method than with the previous three-segment method, because more accurate estimates of the thermally induced pressure changes produced by ambient changes in the product temperature field can be made from the second and/or higher-order derivatives of the measured pressure data than from a simple average of the pressure changes in bracketing measurement periods. Better performance is also achieved because a test can be conducted using only data that are the least contaminated by the adverse effects of the thermal perturbation produced by changing the pressure during the test. If two measurement periods are used to conduct a test, they can be located and separated sufficiently in time to minimize the adverse effects of the thermal perturbation, but without requiring a test duration that is too long for accurate compensation of the ambient product temperature changes. This is achieved by ensuring that each measurement period is sufficiently distant from a pressure change to minimize the effects of that pressure change.

In the preferred embodiment of the present invention, a test is conducted at two pressures, $P_1$ and $P_2$, and the pressure data from two measurement periods, one at each pressure, are analyzed. The only restriction is that the lower pressure must be sufficiently above zero gauge (or atmospheric pressure) to allow the time-dependent pressure quantities to be determined. For best performance, the measurement periods should be as distant in time as possible from the preceding pressure changes.

Figure 9A:
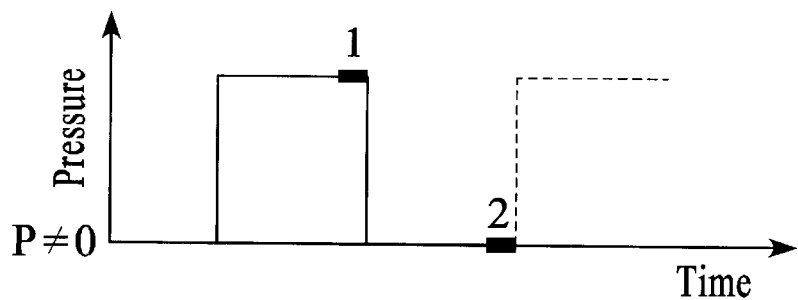
FIG. 9(a) shows pressure vs. time for a preferred embodiment of the method of the present invention used to conduct a leak detection test when circumstances demand an initial pressure change before the test.
Figure 9B:
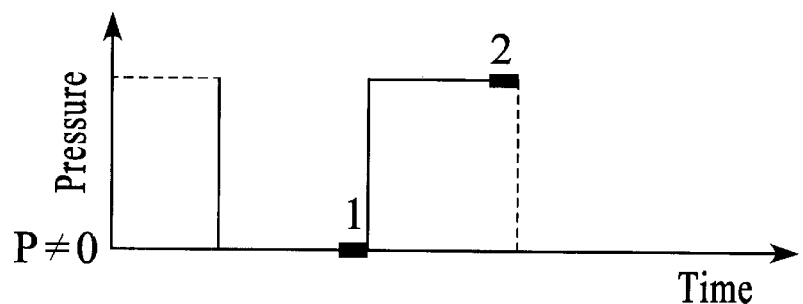
FIG. 9(b) shows an alternate pressure vs. time for a preferred embodiment of the method of the present invention used to conduct a leak detection test when circumstances demand an initial pressure change before the test.

FIGS. 9a and 9b illustrate two simple test configurations that might be used when a pressure change is required before a test. As shown, the time interval between the mid-point of the pressure change and the mid-point of the measurement period is the same for each pressure. This is not a necessary requirement for the conduct of a test, but it is convenient from an operational and interpretation standpoint. The main requirement is that this time interval be long enough to minimize the effects of the pressure-induced thermal perturbations. Such a configuration is typical of how the method might be implemented with a portable system.

Figure 10A:
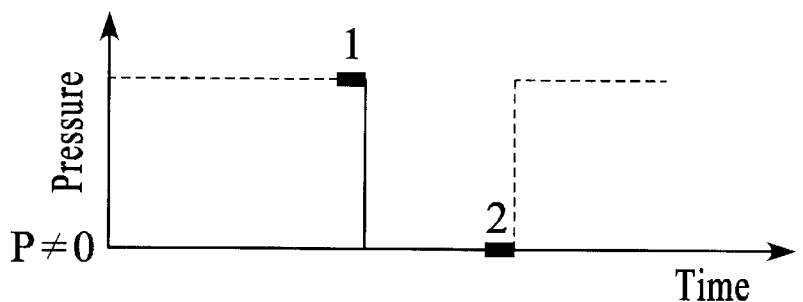
FIG. 10(a) shows pressure vs. time for the method of the present invention when the initial pressure is already stabilized at an acceptable pressure for a test.
Figure 10B:
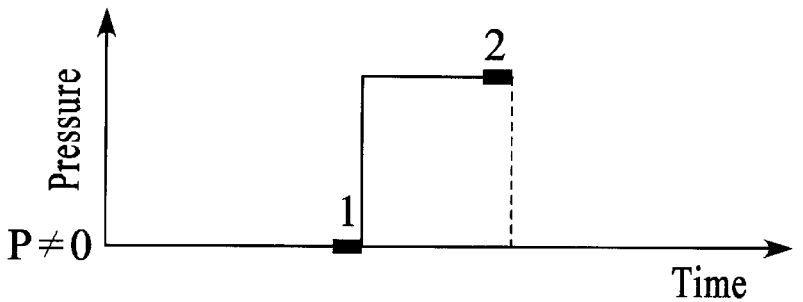
FIG. 10(b) shows an alternate pressure vs. time for the method of the present invention when the initial pressure is already stabilized at an acceptable pressure for a test.

FIGS. 10a and 10b illustrate two simple test configurations in which the line is already at the desired pressure for initiating a test and any previous pressure change occurred sufficiently long ago not to impact the test. In both configurations the test period can begin immediately, and the duration of each measurement period can be different. These configurations are typical of how the method might be implemented as an on-line monitoring system.

The measurement periods should be long enough that accurate measurements can be made of the rate of change of pressure (i.e., the pressure rate) and the second derivative of the pressure data. In many types of pipe systems, a measurement period of approximately 20 min is sufficient for accurate test results. Shorter or longer periods may be used depending on the size of the line, the precision of the pressure sensors, and the characteristics of the pressure data. Although it is not a requirement, measurement periods at different pressures are usually of equal duration, principally for operational convenience and ease of interpretation of the test results.

In the preferred embodiment, the method for computing the difference in temperature-compensated pressure rate (TCPR) due to a leak between two pressures, $P_1$ and $P_2$, is given by $$TCPR(\Delta P, t_2) = PR_2(P_1, t_2)_{est} - PR_2(P_2, t_2)_{meas} \quad (4)$$

Where $\Delta P = P_1 - P_2$, the pressure rate $PR_{2\ est}$ is made at time $t_2$ and pressure $P_1$ from the pressure data obtained at both measurement periods, and the measured pressure rate, $PR_{2\ meas}$, is made at time $t_2$ and pressure $P_2$. The estimated pressure rate for the second measurement period includes an estimate of the difference in the thermally induced product pressure change between the two measurement periods.

In the preferred embodiment, the pressure rate measured during the second measurement period is estimated from the rate of change of pressure measured during the first measurement period (first derivative of the pressure data) and an estimate of the average second derivative of the pressure data obtained from both measurement periods. This estimate is given by $$PR_2(P_1,t_2)_{est} = PR_1(P_1,t_2)_{meas} + ((m_1+m_2)/2)*(\Delta t) \quad (5)$$

where $m_1$ is the second derivative of the pressure data (i.e., $d^2V_1(P_1,t_1)/dt^2$) collected during the first measurement period (which is computed from the derivative of the pressure rate data, $d[PR_1(P_1,t_1)]/dt$), $m_2$ is the second derivative of the pressure data (i.e., $d^2P_2(P_2,t_2)/dt^2$) collected during the first measurement period (which is computed from the derivative of the pressure rate data, $d[PR_2(P_2,t_2)]/dt$), and $\Delta t$ the time between the mid-points of the two measurement periods. The temperature-compensated volume rate computed by differencing the measured and estimated pressure rates during the second measurement period is then given by $$\begin{aligned} TCPR(\Delta P, t_2) &= PR_2(P_1, t_2)_{est} - PR_2(P_2, t_2)_{meas} \quad (6)\\ &= [PR_1(P_1, t_1)_{meas} + ((m_1+m_2)/2)\Delta t] -\\ &\quad PR_2(P_2, t_2)_{meas}\\ &= [PR_1(P_1, t_1)_{meas} - PR_2(P_2, t_2)_{meas}] +\\ &\quad ((m_1+m_2)/2)\Delta t \end{aligned}$$

Eq. (5) states that the TCPR is determined from the difference between the pressure rates measured at each pressure and a correction term for the curvature determined from the second derivative of the pressure data. Eq. (6) can be generalized to $$TCPR(\Delta P,t_2) = [PR_1(P_1,t_1)_{meas} - PR_2(P_2,t_2)_{meas}] + NLPCT \quad (7)$$

where NLPCT is the nonlinear volumetric correction term.

There are a number of reasons why this method gives a more accurate estimate of the temperature-compensated pressure rate than the earlier, three-segment method described in U.S. Pat. No. 4,608, 857. First, the three-segment method taught by Mertens is not designed to compensate perfectly when the second derivative of the ambient thermally induced changes is not constant. The method of the preferred embodiment of the present invention accurately compensates for the ambient thermally induced pressure changes when the second derivative of the volume changes is not constant. The two-segment method of the present invention, although designed to compensate for these changes when the second derivative is linear, works well for most product temperature conditions even when the second derivative is not linear.

There are many ways to estimate the correction term in Eq. (7). If the second derivative of the pressure changes is not constant, one can use higher-order derivatives to estimate the correction term. For example, the third derivative of the pressure changes in each measurement period can be used to estimate the second derivative. Also, estimates of the correction term can be made from any of the pressure data collected during a test or by models.

There are a number of standard time series analysis methods for computing the first, second, and higher-order derivatives of the pressure data. These time series analysis methods can be applied to the actual measured pressure data, or to the same data after some form of smoothing has been applied. Smoothing could be accomplished by averaging the data over time, by using a low-pass filter, or by fitting a curve to the data. (Smoothing is necessary only if the pressure fluctuations are large enough to prevent accurate estimates of the derivatives.)

The method, wherein the second or the second and higher order derivatives of the pressure data are used to estimate the nonlinear correction term, NLPCT, will very accurately compensate for the ambient thermally induced pressure changes. The improvement in accuracy, however, can be offset by the additional data that may be required in order to make reliable estimates of the higher-order derivatives. In practice, the second-derivative method described by Eq. (6) does an excellent job of thermal compensation. If the third derivative must be invoked to compensate for the nonlinear volume changes, then the duration of the measurement period (and the total duration of the test) usually needs to be increased. However, any increase in the duration of the test or a measurement period usually increases the degree of nonlinearity that may be present. This additional nonlinearity can be compensated for provided that an accurate estimate of the third derivative can be made during each measurement period. (If accurate estimates can be made of the third derivative using the same data required to estimate the second derivative, then test performance also improves.)

Alternative Embodiments of the Three-Segment Method

The two-pressure, three-measurement-period method in U.S. Pat. No. 4,608,857 specifies that the duration of the three measurement periods be approximately equal, that the intervals between the measurement periods be approximately equal, and that the intervals between each measurement period and the preceding pressure change be approximately equal. One or more of these constraints can be removed, but at the expense of some degradation in the accuracy of the measurement.

The first constraint—that on the duration of the measurement period—can be removed provided that an accurate estimate of the pressure changes during each period can be made. It is possible to conduct a test with measurement periods of different lengths; in practice, such an approach would be necessary only if some of the data from a given measurement period were contaminated or missing.

The second constraint—that the intervals between the measurement periods be approximately equal—can be removed provided that the pressure change data in each measurement period are properly weighted by time and are measured with sufficient accuracy.

The third constraint—concerning the interval between the measurement period and the preceding pressure change—can also be removed provided that, as with the second constraint, the contribution of the pressure change to the measured pressure change noted during each measurement period is weighted by time. Uneven spacing may be required so the that the interval between a given measurement period and the preceding pressure change can be better maximized.

Eq. (1) can be weighted to allow different spacings between any of the three (or more) measurement periods; for example, this is given by $$TCPR(P_{wt\ avg}-P_2,t_2)=[(a_2 PR_1(P_1,t_1)+a_1 PR_3(P_2,t_3))/a_1]-[(a_1+a_2)/a_1]PR_2(P_1,t_2) \quad (8)$$

where $a_1$ and $a_2$ are the time intervals between the mid-points of measurement periods 1 and 2 and the mid-points of measurement periods 2 and 3, respectively. Unequal intervals between measurement periods may be employed to (1) avoid operational artifacts during a test or (2) increase the temporal spacing between a measurement period and the preceding pressure change without increasing the duration of the test. The latter method can be used to minimize the effects of pressure-induced perturbations.

Compensation of Pressure-Induced Thermal Perturbations

If the pressure-induced thermal perturbations during the measurement periods are large, a systematic error in the computation of the temperature-compensated rate of change of pressure will result. This systematic error is predictable and can be calculated directly using a heat transfer model, estimated directly from the results of actual leak detection tests on nonleaking lines, or estimated by a special test on the line being tested. The data required to estimate the systematic error specified by the second method can be collected on the line to be tested or on other lines. The former approach is only effective when the method is installed on a line (usually a new line) that is verified to be tight using another method of leak detection. The latter approach can be used to test a line of unknown integrity without any calibration data being collected on the line itself.

Model Estimate

A small change in the temperature of a liquid in a pressurized pipe will be produced whenever the pressure in the pipe is changed. These product temperature changes can be estimated empirically, and a heat transfer model can be used to predict the rate of change of temperature due to this temperature discontinuity. Empirical measurements of these pressure-induced thermal changes have been made in an instrumented underground pipe system. The pressure-induced thermal changes were generated by turning the pump that was used to transfer product through the line on and off. With each pressure change, small spikes in the temperature of the product were measured with thermistors that had been inserted into the line. This pressure-temperature effect is a well-known physical phenomenon and has been important in a number of other applications, such as physical oceanography. If the pressure is changed very quickly so that no heat is lost, then an adiabatic change in temperature will occur.

Figure 1A:
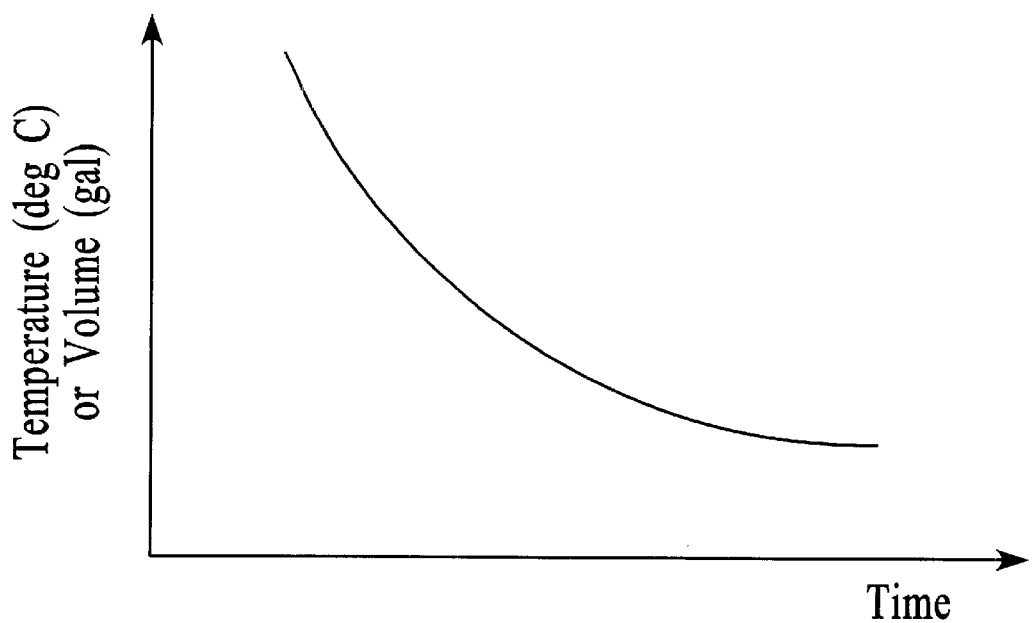
FIG. 1(a) is a time history of how the temperature and volume of a product changes in an underground pipe system after product transfers cease, in which the temperature of the product in the pipe system is greater than that of the surrounding backfill and soil.
Figure 1B:
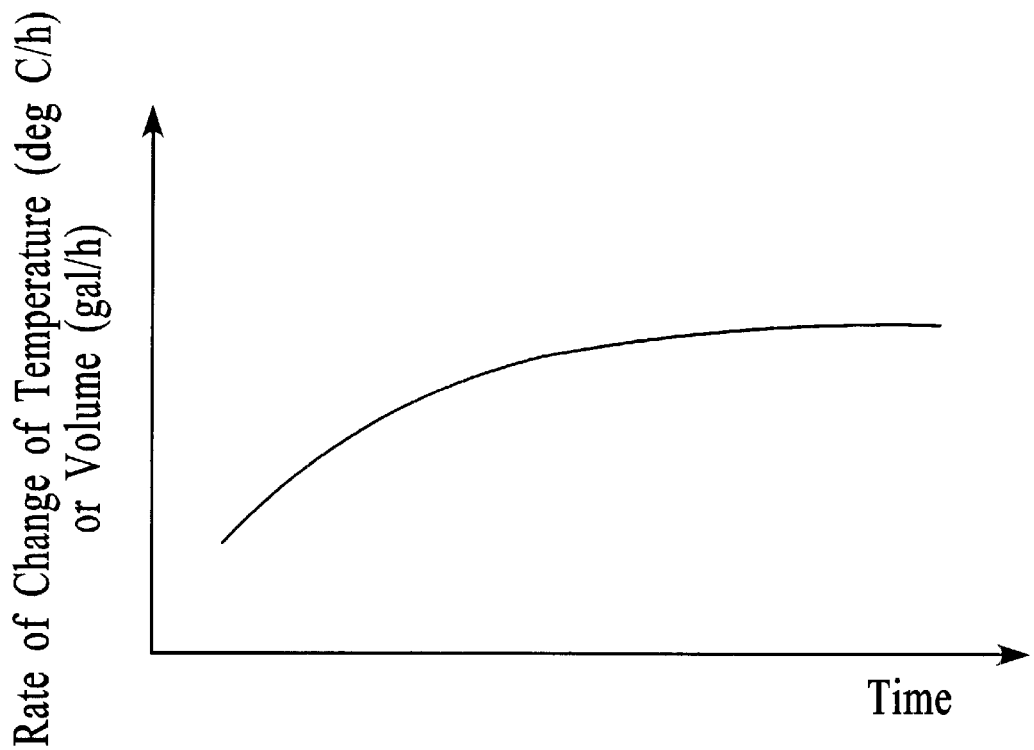
FIG. 1(b) is a time history of how the rate of change of temperatures and volume of a product changes in an underground pipe system after product transfers cease, in which the temperature of the product in the pipe system is greater than that of the surrounding backfill and soil.
Figure 2A:
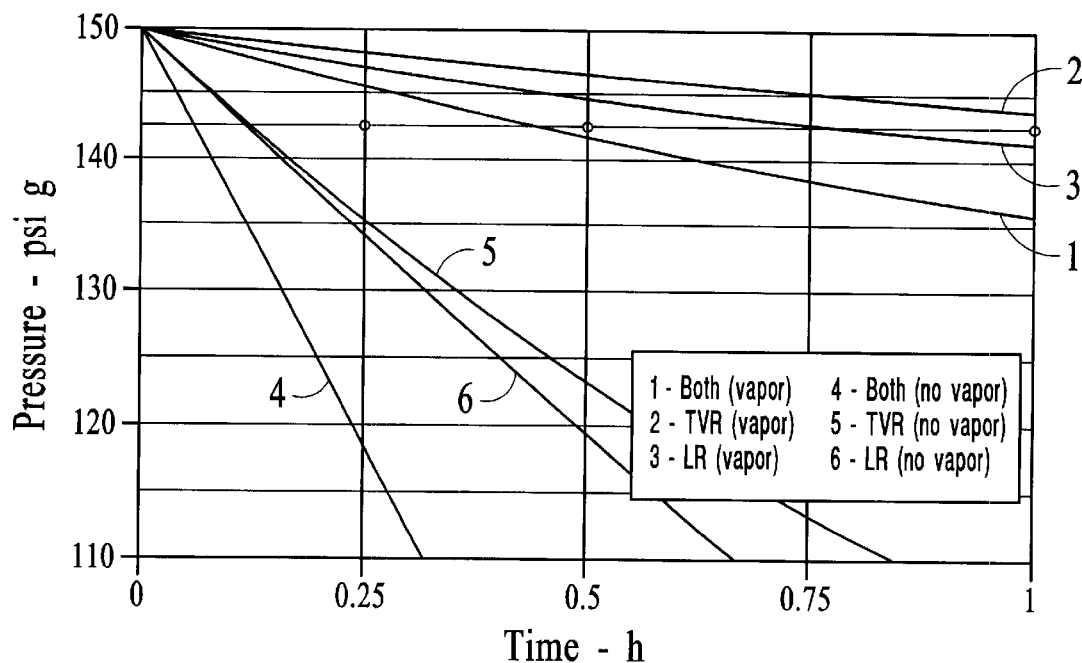
FIG. 2(a) illustrates the pressure changes for a moderate decrease in product temperature over time, with and without vapor in the line and with and without a leak of 1 gal/b for two different line capacities for a 1-h pressure change in a line with 3,133 gal of jet fuel.
Figure 2B:
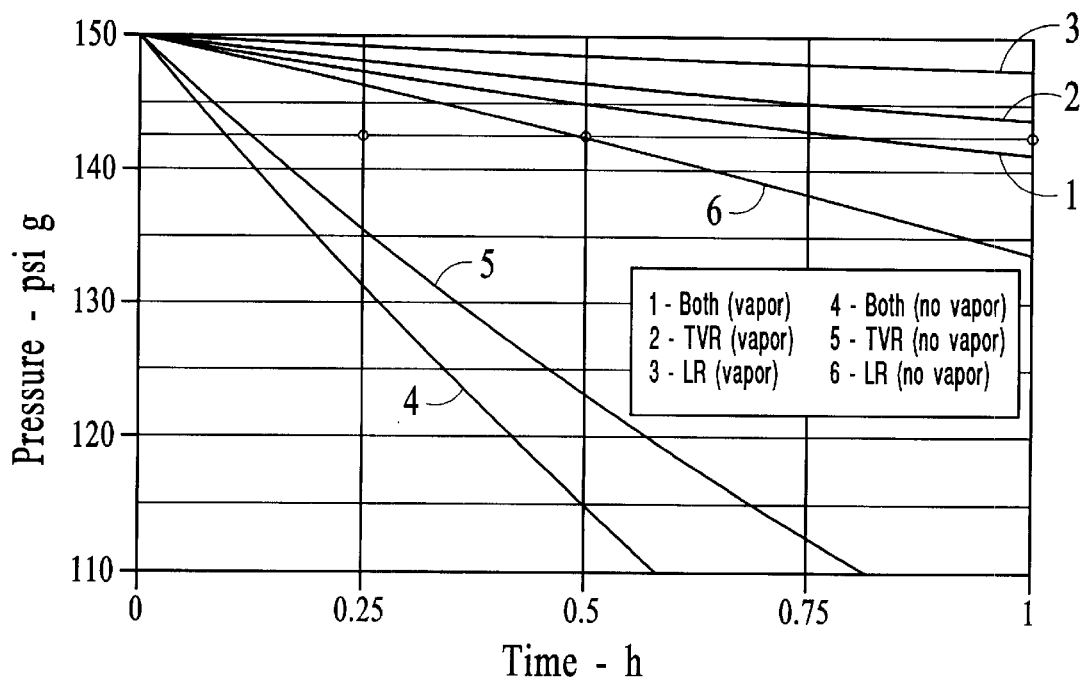
FIG. 2(b) illustrates the pressure changes for a moderate decrease in product temperature over time, with and without vapor in the line and with and without a leak of 1 gal/h for two different line capacities for a 1-h pressure change in a line with 12,533 gal of jet fuel.
Figure 3A:
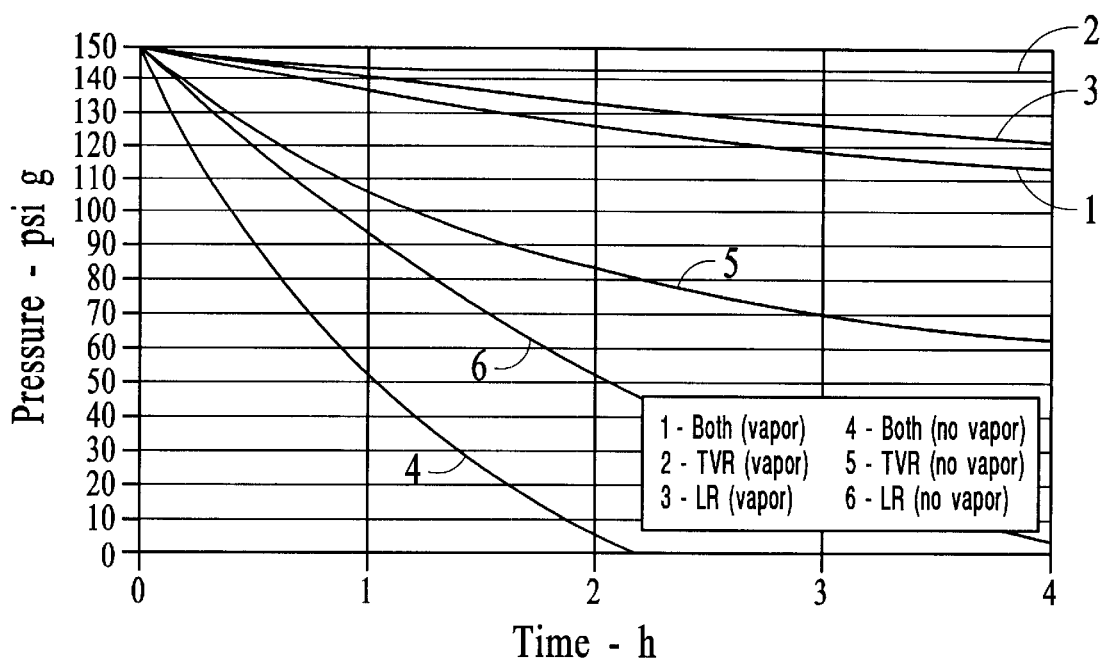
FIG. 3(a) illustrates the pressure changes for a moderate decrease in product temperature over time, with and without vapor in the line and with and without a leak of 1 gal/h for two different line capacities for a 4-h pressure change in a line with 3,133 gal of jet fuel.
Figure 3B:
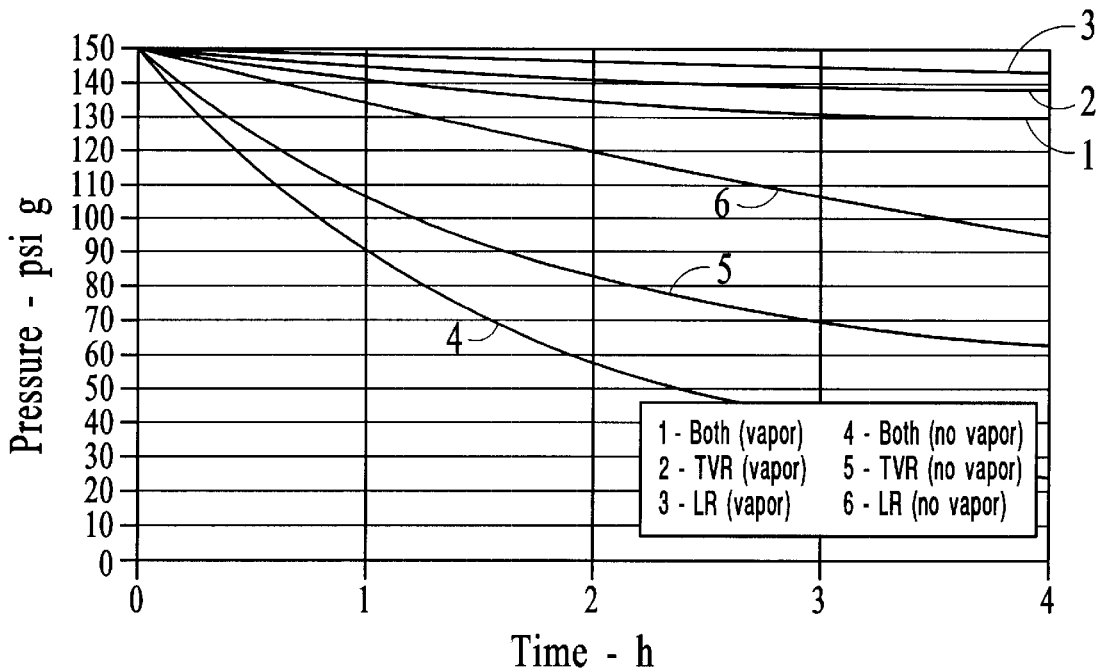
FIG. 3(b) illustrates the pressure changes for a moderate decrease in product temperature over time, with and without vapor in the line and with and without a leak of 1 gal/h for two different line capacities for a 4-h pressure change for a line with 12,533 gal of jet fuel.
Figure 4A:
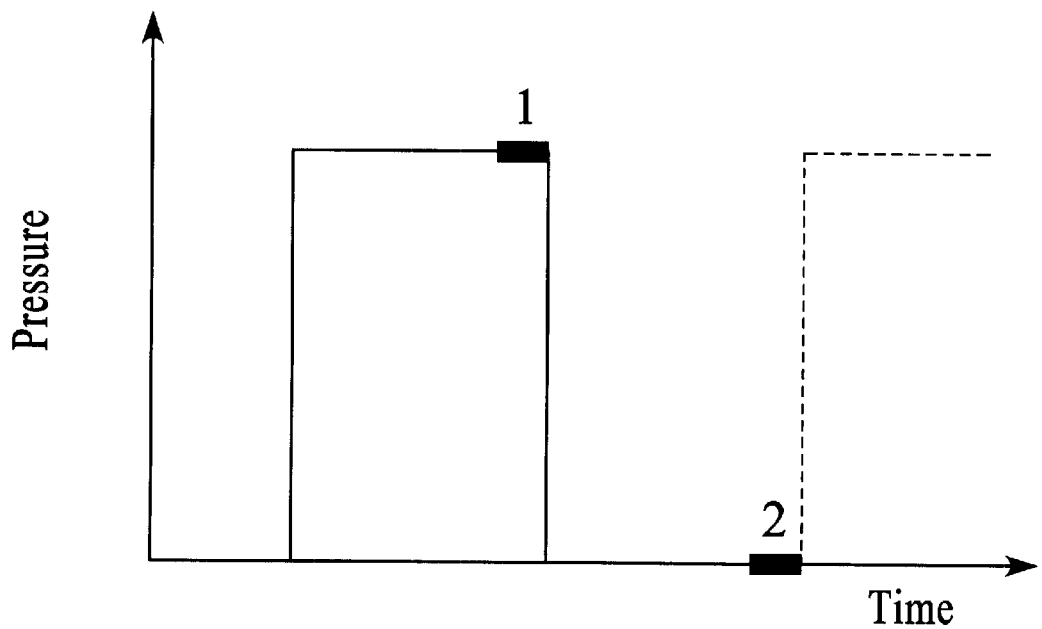
FIG. 4(a) illustrates the test protocol pressure changes induced in the product in a pipe system given the same variables described in FIG. 1 (where product is added whose temperature differs from that of the surrounding backfill and soil) but with the additional variable that pressure is increased and decreased as it is during a leak detection test.
Figure 4B:
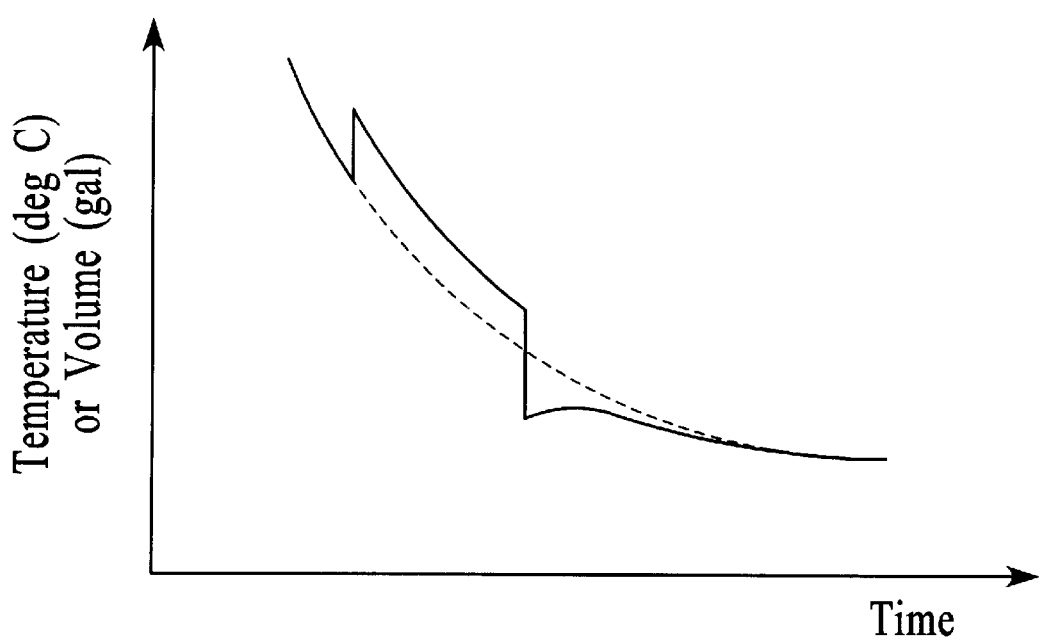
FIG. 4(b) is a time history of the temperature in the test as described in reference to FIG. 5(a)

The heat transfer model that was developed and validated under field conditions accurately predicts the rate of change of temperature of the product in an underground pipe due to a temperature difference between the product in the pipe and the backfill and surrounding soil. These ambient temperature changes can be very large if the temperature difference is large. This model can be used to predict the rate of change of temperature due to a pressure change in an underground (or aboveground) line. As shown in FIG. 4, the small product temperature change produced by a pressure change immediately attempts to come into equilibrium with the ambient product temperature. If there is enough time between the pressure change and the next measurement period(s), the perturbed temperature field will come into equilibrium with the ambient (mean) temperature field, which process can be accurately compensated for by the methods presented in this disclosure. If the time between the pressure change and the measurement period(s) is too short, then the pressure-induced thermal perturbation may still be present, and if so, will affect the accuracy of the test result.

The model shows that the rate of change of product temperature due to this pressure change is a function of the type of product in the line, the magnitude and duration of the pressure change, and the thermal properties of the product in the pipe, the pipe wall, and the material surrounding the pipe. For a given product and pressure change, the rate of change of product temperature it is mainly controlled by the thermal diffusivity of the material (usually backfill and soil) around the pipe, the thermal diffusivity of the product in the pipe, and the duration and temperature of the previous product transfers. The previous product transfer history is important because it tends to thermally condition the backfill and soil and to control the time constant of the product temperature changes. The thermal properties of the pipe itself are usually small, because the pipe wall is relatively thin. Accurate model predictions can be made for a wide range of pipe systems because the heat transfer in the ground is controlled by molecular conduction, the range of thermal diffusivities of the backfill and soil surrounding the pipe are well bounded, and the conditions under which petroleum product is transferred through piping systems tend to be similar regardless of the type of operation (e.g., hydrant fuel distribution systems at airports, bulk transfer piping at marketing terminals, and pressurized piping at retail service stations).

Once the product temperature changes are known, then the effects on pressure tests can be determined. For a pressure test, the thermally induced pressure changes are proportional to the rate of change of temperature, the coefficient of thermal expansion of the product, and the bulk modulus of the product in the line (and the line and appurtenances on the line). For a given type of line and a given type of product in the line, the magnitude of this pressure-induced thermal perturbation is mainly dependent on the magnitude of the pressure change and the time between the pressure change and the measurement period. For small lines tested under small pressure differences, like those lines found at bulk fueling facilities, this effect can be made negligible. As mentioned above, this is accomplished by increasing the time interval between a measurement period and the pressure change preceding it. This effect was measured in many leak detection tests on an underground line over a wide range of product temperature and ground temperature conditions. This effect cannot always be neglected if the pressure difference is large or if the bulk modulus of the line is large. This is almost always true for airport hydrant fuel distribution lines. In this case, the systematic error can be large and can adversely impact the results of a leak detection test.

The magnitude of this systematic error (bias) on the method of leak detection described in this disclosure and the prior-art patents can be predicted with the heat transfer model. First, the model is used to predict the product temperature conditions, which include the effect of product transfers immediately prior to a test, when the temperature of the product differs from that of the backfill and soil, and then to predict the effect of the pressure changes required to implement the method of leak detection described in this disclosure and previous prior-art patents. Second, the pressure changes resulting from the product temperature changes are then calculated for the line. Finally, the temperature-compensated pressure rate is calculated using the method described in this disclosure and the prior-art patents. The temperature-compensated pressure rate is equal to the systematic error, because if no pressure changes occurred during the test period and the method described in this disclosure and prior-art patents were used to compute the temperature-compensated pressure rate, then the computed rate would be zero. The systematic error can be calculated for these methods, because they accurately compensate for the ambient product temperature changes that are normally present. The same modeling approach would work for any method that accurately compensates for the ambient product temperature changes.

Data Estimate

This systematic error can also be estimated from the results of leak detection tests on actual lines, provided that they are not leaking, using the methods described in this disclosure. The measured temperature-compensated pressure rate contains three types of pressure contributions: (1) the systematic error due to the pressure changes during and before the test, (2) the residual error in compensating for the ambient thermally induced pressure changes, and (3) the random measurement error inherent in the instrumentation. The latter two errors can be easily minimized, so that a direct measurement of the systematic error can be made. The random instrumentation error can be minimized by averaging a number of tests together. The residual error in compensation can be computed from the test error, which is derived by applying the method when the pressure is a constant over all measurement periods. While the heat transfer model indicates that the backfill, product and transfer conditions will affect the magnitude of the systematic error, accurate estimates can be made for many different types of petroleum operations because the backfill, product, and transfer conditions are very similar. This is especially true for major airport hydrant systems in which product is continuously transferred through the lines for approximately 19 h each day.

Estimates of the magnitude of the systematic error have been compiled from many leak detection tests on nonleaking lines as a function of pressure and line size. This correlation includes tests throughout different regions of the country and different seasons of the year. The correlation shows that the systematic error is proportional to pressure. This type of estimate could also be made on the line to be tested, once it is known to be leak free. Such an estimate is best derived on new lines or for on-line monitoring systems.

Direct Measurement

Figure 11A:
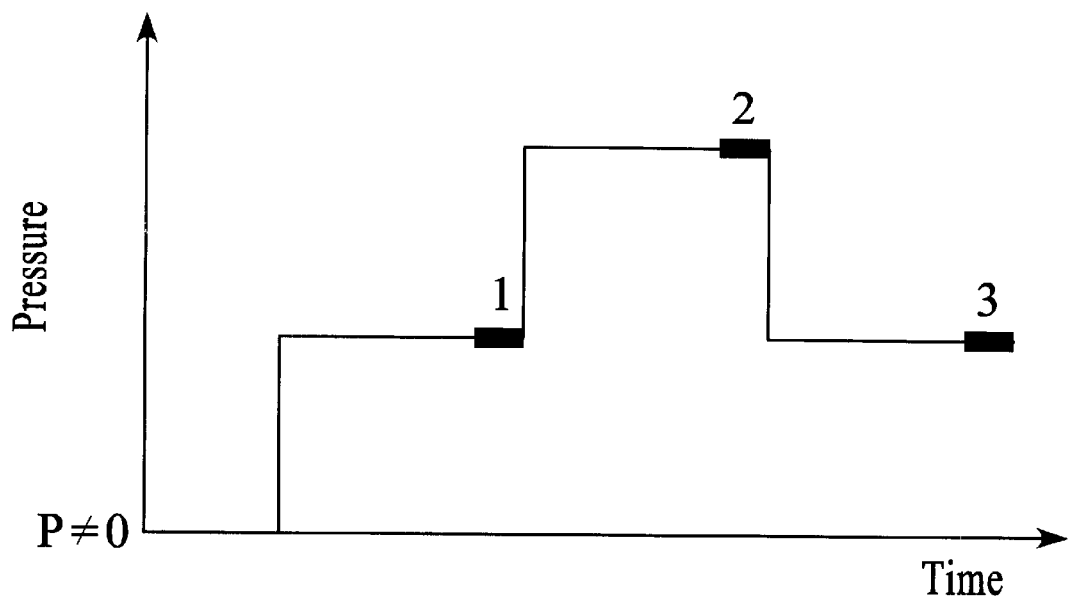
FIG. 11(a) shows pressure vs. time for a measurement sequence to estimate the systematic bias error produced by pressure-induced thermal perturbation.
Figure 11B:
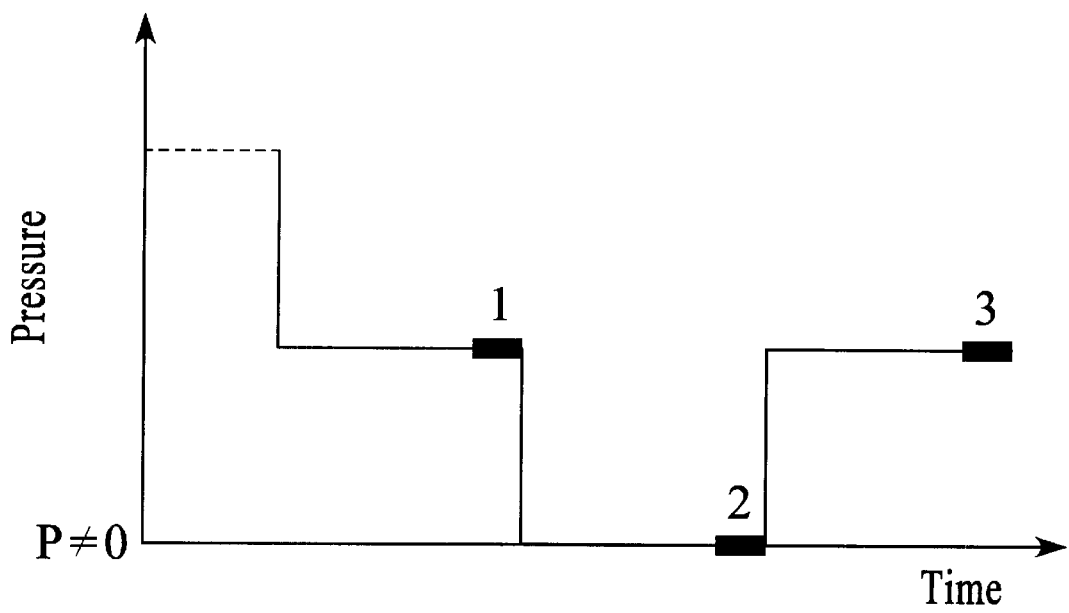
FIG. 11(b) shows an alternate pressure vs. time for a measurement sequence to estimate the systematic bias error produced by pressure-induced thermal perturbation.

A special test comprised of three measurement periods can be conducted to estimate the magnitude of the systematic error. This systematic error can be estimated in this special test even if the line has a leak of unknown rate. The systematic error can be computed by differencing the results of two separate leak detection tests using the two-segment method described in this disclosure and one of the two three-pressure test configurations shown in FIGS. 11a and 11b. The pressure test configurations require an initial pressure change that is equal to 50% of the lowest and highest pressures. The first test is conducted at the first two pressures, and the second test is conducted at the last two pressures. The difference in the temperature-compensated volume rates is equal to the systematic error for this pressure difference. The results of either leak detection test are determined by subtracting (or adding) the measured systematic error. This testing procedure can suffice as a leak detection test if the pressure difference is large enough or the bias from this measurement can be scaled in proportion to pressure for a test conducted over a different set of pressures. As illustrated in FIGS. 11a and 11b, the three-pressure test can be initiated at the lowest pressure (FIG. 11a) or the highest pressure (FIG. 11b). (The pressure increments are equal so that the method will work even if the line is leaking and no accurate model exists to calculate how the leak changes in that line as a function of pressure.)

While the systematic error can be determined for the line being tested, this procedure increases the time required to complete a test, and thus, is best applied once the line is declared leaking. The special three-pressure test would be conducted between the highest and lowest pressures of the leak detection test and would utilize the last pressure and measurement period of the actual leak detection test as the first pressure and measurement period of the special test. The systematic error measured in this special test would be 50% of the systematic error required to correct the leak detection test.

Minimizing the Pressure-Induced Thermal Perturbation

The systematic error produced during a test by pressure-induced thermal perturbations can be compensated for by any of the methods described in Sections 4.3.1 through 4.3.3. Another approach is to minimize the magnitude of the systematic error so that it is small enough to be negligible in a specific testing application. A number of ways for reducing the magnitude of this systematic error were discussed in Section 1.2.2. As stated in that section, the error can be reduced in any of three ways: by reducing the pressure differential used in testing the line, by reducing the number of pressure changes required for a test, and by increasing the time between any pressure change and the subsequent measurement period.

All three ways are compatible with the method presented herein. The first one is not method-related, yet it can produce significant benefits in method performance. The last two, which are method-related, can be applied with good results because the method requires only two measurement periods and one pressure change. For optimal results, the time intervals between a pressure change and the subsequent measurement period need to be maximized, and the time intervals between measurement periods need to be minimized. This is most easily accomplished by using a test with only two measurement periods. This means that for a given test duration the measurement periods are positioned as illustrated in FIGS. 9 and 10. This approach to minimizing the systematic error works well provided that the test duration is shorter than the amount of time required to completely minimize the error due to both the pressure-induced thermal perturbation and the ambient thermal changes. If the test duration is too long, then several estimates of the TCVR should be made, each based on a different measurement-period configuration, until the test error has been minimized. The heat transfer model described in the above discussion entitled "Model Estimate" or the test data discussed in the above section entitled "Data Estimate" can be used to determine and verify the appropriate parameters, in terms of line volume, pressure change, and test duration, for minimizing the error. This approach is particularly effective for small lines, and, if they are not too large, for lines operated at low pressures.

Since the systematic error occurs because the perturbed temperature field at one or both pressures has not come back into equilibrium with the ambient temperature field, another minimization approach is to extrapolate the pressure or pressure rate data by using a model or by curve-fitting until the perturbed temperature field is approximately in equilibrium with the ambient temperature field. Then, the TCPR can be computed using the extrapolated data. This approach has the net effect of increasing the duration of the test without actually physically doing so.

SUMMARY

In summary, the magnitude of the systematic error produced by pressure changes during a test can be estimated from a model calculation, test results from many different nonleaking lines, test results from the line to be routinely tested once it is verified to be leak free, and by a special test on the line being tested, even if it has a leak. This estimate of the systematic error is then subtracted from the test result computed using the method of this disclosure. Another approach is to minimize the magnitude of the error by judicious selection of the time intervals between measurement periods and those between measurement periods and pressure changes. This approach is particularly effective for lines with small volumes that operate at low pressures.

Estimating the Error in the Temperature-Compensated Volume Rate

The accuracy of a test using the method described in this disclosure depends primarily on the accuracy of compensating for the nonlinear product temperature changes that occur during that test. The error in the temperature compensation can be estimated for a given test by several different means.

The first is to conduct a leak detection test immediately before or after the actual leak detection test but without changing the pressure. In practice, this means that additional data are collected either before or after the completion of a leak detection test at the same pressure used initiate the test or the same pressure used at the completion of a test. This error estimate mainly indicates how well the ambient product temperature changes have been compensated for, but does not include the error due to the uncompensated pressure-induced thermal perturbations. This method of estimating the test error for a test with three or more measurement periods is more fully described below.

The second, which includes the error due to both the ambient product temperature change and the pressure-induced thermal perturbation, can be calculated using the pressure data collected during a test. This estimate is made by differencing the results of a two-pressure, two-segment test with the results of a two-pressure, three-segment test of the same duration, where the third segment is located between the other two segments. If this difference is small or approximately zero, then it can be concluded that the effects of both thermal errors are negligible. If the difference is not small, this error estimate should be interpreted only as an upper bound on the error, because the middle segment of this test may be contaminated by the pressure-induced thermal perturbation more than the two end segments. If the effects of the pressure-induced thermal perturbations are negligible, then any nonzero estimate is a direct measure of the compensation of the ambient product temperature changes.

The third is to compute the error directly from the higher-order derivatives of the pressure data. Eq. (6) uses the second derivative of the pressure data in two measurement periods to estimate the nonlinear volume change. The error can be computed using the third- and higher-order derivatives of the volume data. If the third derivative of the data were a constant, then the error for this implementation of the method, except for sensor measurement error, would be zero. If not, then the error is the difference between the pressure changes estimated using the second derivative and the pressure changes estimated using the third (and higher-order derivatives). The accuracy of this error estimate is dependent on the precision of the sensors and the duration of the measurement period. If the third derivative of the pressure data is known to be a constant, then the error in the temperature-compensated pressure rate can be computed using only the third derivative. This is given by $$[d(m_1)/dt + d(m_2)/dt] * 0.5 * (\Delta t)^2 \qquad (9)$$

The fourth is to estimate the maximum acceptable error for a test, which includes both thermal effects, from the difference in the rate of change of the pressure changes (second derivative of the pressure data) measured during each measurement period of a two-pressure, two-segment test. Large differences mean that the pressure and pressure-change data are highly nonlinear. The error is a percentage of this total pressure change, usually 1 to 10%. If any of these errors are too large, then the leak detection test should be repeated before a reliable decision about the status of the line can be made.

A number of other data quality checks can be made to verify that the underlying assumptions of a test are valid. One such test is to verify that the measured pressure changes in successive measurement periods at the same pressure, or when the second pressure is lower than the first pressure, decrease in magnitude over time and do not change sense. Again, if the data fail any of these data quality checks, the test should be repeated.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for use in detecting a leak in a pipeline system comprising:

measuring a difference in a rate of change of pressure due to a leak between one pressure level and at least one other pressure level after compensation has been made for thermally induced changes in the pressure in a pressurized pipeline system, including the steps of
    (a) pressurizing said pipeline system to a first pressure level and determining a set of first pressure data by measuring a change in pressure in the pipeline system that occurs over a first measurement period;
    (b) pressurizing said pipeline system to at least a second pressure level and determining a set of second pressure data by measuring a change in pressure in the pipeline system that occurs over at least a second measurement period; and
    (c) computing a difference in a temperature compensated rate of change of pressure between a first pressure level during said first period and a pressure level during said second period, said computing performed on said first and second pressure data and including a correction for thermally induced non-linear changes of pressure between the measurement periods, wherein the difference in the temperature compensated rate of change of pressure between the pressure levels is computed from the rate of change of pressure calculated from said first and second data and at least one higher order derivative of the pressure data.

2. A method as recited in claim 1 further comprising the step of comparing the difference in temperature compensated rate of change of pressure to a threshold value to determine whether said pipeline system has a leak.

3. A method as recited in claim 1 further comprising the step of computing the temperature compensated rate of change of pressure due to a leak rate at a specific pressure using a model that describes the rate of change of pressure due to a leak as a function of pressure.

4. A method as recited in claim 1 further comprising the step of computing a difference in a temperature compensated volume rate using a hydraulic model that converts the pressure changes to volume changes.

5. A method as recited in claim 4, further comprising the step of comparing a difference in said temperature compensated volume rate to a threshold value to determine whether said pipeline system has a leak.

6. A method as recited in claim 4, further comprising the step of computing the temperature compensated volume rate due to a leak rate at a specific pressure using a model that describes the volume rate due to a leak as a function of pressure.

7. A method as recited in claim 1 wherein a duration of said measurement periods is approximately equal.

8. A method as recited in claim 1 wherein a test duration and a time interval between said first and second measurement periods and between said measurement periods and pressure-level changes are selected to minimize a combined error due to ambient thermally induced pressure changes and pressure induced thermal perturbations.

9. The method of claim 1 wherein said time intervals between said measurement periods and said time intervals between said measurement periods and said pressure-level changes for a given test duration are selected to minimize a combined error due to ambient thermally induced pressure changes and pressure induced thermal perturbations.

10. The method of claim 9 wherein said combined error is minimized by maximizing said time intervals between each said measurement period and a previous pressure-level change and by minimizing said time interval between said measurement periods.

11. A method as recited in claim 1 wherein said higher order derivative is a second order derivative of the pressure data with time.

12. A method as recited in claim 1 wherein said higher order derivative includes a second order derivative and a third order derivative of the pressure data with time.

13. A method as recited in claim 1 wherein said computing includes the steps of (a) computing said first order derivative of the pressure data during said first measurement period at a first selected pressure level, and computing and first derivative of the pressure data during said second measurement period at a second selected pressure level;
    (b) computing a plurality of second order derivatives of the pressure data during said first and second measurement periods;
    (c) computing an average of said second order derivatives obtained in step (b);
    (d) estimating a change in rate of change of pressure between said first and second measurement periods by multiplying a time at a mid-point of said measurement periods by said average obtained in step (c);
    (e) estimating a first derivative of the pressure data during said second measurement period, which does not include any incremental pressure change due to a leak between the two pressures, by adding the estimate computed in step (d) to said first derivative of the pressure data measured during said first measurement period; and
    (f) computing a difference in a temperature compensated rate of change of pressure between said first and second pressures by subtracting said estimate obtained in step (e) from said first derivative measured in step (a) during said second measurement period.

14. A method as recited in claim 13 further comprising estimating an error in a measurement of the difference in the rate of change of pressures between different pressure levels, wherein during at least two of the measurement periods the pressure level is initially the same, and the error is estimated from the difference in the changes of pressure measured during the measurement periods when the pressure level is initially the same.

15. A method as recited in claim 1 wherein the difference in the temperature compensated rate of change of pressure between the pressure levels is computed from the rate of change of pressures measured during the measurement periods, said rate of change being a first derivative of the pressure data and said difference is additionally computed from a rate of change of the rate of change of pressure during the measurement periods, said rate of change of rate of change being a second derivative of the pressure data.

16. A method as recited in claim 15 wherein the difference in the temperature compensated rate of change of pressure between the pressure levels is additionally computed from a third derivative of the pressure data collected during the measurement periods.

17. A method as recited in claim 16 wherein the difference in the temperature compensated rate of change of pressure between the pressure levels is additionally computed from higher order derivatives of the pressure data collected during the measurement periods.

18. A method as recited in claim 1 wherein during at least two of the measurement periods the pressure level is initially the same, and the error is estimated from the difference in the changes of pressure measured during the measurement periods when the pressure level is initially the same.

19. A method as recited in claim 1 further comprising estimating a systematic bias error due to pressure induced temperature perturbations during measurements of the difference in rate of change of pressures between different pressure levels on a pressurized pipeline system, said measurements conducted when the pressurized pipeline system is known not to be leaking to obtain the systematic bias error for the pressure, line volume, and liquid at which the measurements are made.

20. A method as recited in claim 19 wherein said estimating includes adjusting the systematic bias error for differences in pressure levels, line volume capacities, and liquid, said adjusting including the steps of
  (a) adjusting the systematic bias error between other pressure levels by extrapolating from the measured changes, if different pressure levels are used;
  (b) adjusting the systematic bias error if the volume capacity of the pipeline system is increased or reduced by extrapolating for the increase of reduction in capacity of the pipeline system; and
  (c) adjusting the systematic bias error obtained for a first liquid to an estimate for a second liquid, when the second liquid is used, by extrapolating for the difference in the thermal coefficients of the expansion for the two liquids.

21. The method of claim 19 wherein the time interval between the mid-point of the pressure-level change and the mid-point of the next measurement period is approximately equal for all measurement periods.

22. A method as recited in claim 1 further comprising estimating a systematic bias error due to pressure induced temperature perturbations during measurements of the difference in rate of change of pressures between different pressure levels on a pressurized pipeline system, said measurements conducted on at least one pressurized pipeline system that may be different from the one being tested and is known not to be leaking, to obtain the systematic bias error over the range of and for the pressure levels, line volumes, and liquids at which the measurements are made.

23. A method as recited in claim 22 wherein said estimating includes adjusting the systematic bias error for differences in pressure levels, line volume capacities, and liquid, said adjusting including the steps of
  (a) adjusting the systematic bias error between other pressure levels by extrapolating from the measured changes, if different pressure levels are used;
  (b) adjusting the systematic bias error if the volume capacity of the pipeline system is increased or reduced by extrapolating for the increase or reduction in capacity of the pipeline systems; and
  (c) adjusting the systematic bias error obtained for a first liquid to an estimate for a second liquid, when the second liquid is used, by extrapolating for the difference in the thermal coefficients of the expansion for the two liquids.

24. A method as recited in claim 22 wherein a time interval between a mid-point of the pressure-level change and a mid-point of the next measurement period is approximately equal for all measurement periods.

25. A method as recited in claim 1 further comprising estimating a systematic bias error due to pressure induced temperature perturbations during measurements of the difference in the rate of change of pressures between different pressure levels on a pressurized pipeline system, said estimating including using a model to estimate the thermally induced pressure changes that would be measured on a pipeline system without a leak to obtain the systematic bias error for the pressure level, line volume, and liquid at which the model estimates are made.

26. A method as recited in claim 25 wherein said estimating includes adjusting the systematic bias error for differences in pressure levels, line volume capacities, and liquid, said adjusting including the steps of
  (a) adjusting the systematic bias error between other pressure levels by extrapolating from the measured changes, if different pressure levels are used;
  (b) adjusting the systematic bias error if the volume capacity of the pipeline system is increased or reduced by extrapolating for the increase or reduction in capacity of the pipeline systems; and
  (c) adjusting the systematic bias error obtained for a first liquid to an estimate for a second liquid, when the second liquid is used, by extrapolating for the difference in the thermal coefficients of the expansion for the two liquids.

27. The method of claim 25 wherein a time interval between a mid-point of the pressure-level change and a mid-point of the next measurement period is approximately equal for all measurement periods.

28. A method as recited in claim 1 further comprising estimating an error in a measurement of the difference in the rate of change of pressures between different pressure levels, said estimating including the steps of
  (a) computing the difference between the second derivatives of the pressure data during two measurement periods; and
  (b) estimating the error as a percentage of the difference obtained in (a).

29. A method as recited in claim 28 further comprising the step of comparing the error to a threshold error value and repeating the preceding steps if the threshold error value is exceeded.

30. A method as recited in claim 1 further comprising estimating an error in a measurement of the difference in rate of change of pressures between different pressure levels on a pressurized pipeline system, said estimating including the step of computing at least the next higher order derivative of the pressure data than is used in the computation of difference in rate of change of pressures, and multiplying said next higher order derivative by the time between the measurement periods.

31. A method for estimating an error in a measurement of the difference in the rate of change of pressures between different pressures, comprising the steps of:
   (a) pressurizing a pipeline system to a first pressure level and measuring changes in pressure of product in the pipeline system that occur over a first measurement period to obtain first measurement data;
   (b) pressurizing said pipeline system to at least a second pressure level and measuring changes in pressure in the pipeline system that occur over at least a second measurement period to obtain second measurement data;
   (c) computing the difference in the temperature compensated rate of change of pressure between one pressure level and at least one other pressure level from said first and second measurement data and wherein said first and second measurement data are corrected for thermally induced non-linear changes of pressure between the measurement periods; and
   (d) estimating the error by using at least two of the measurement periods wherein the pressure level is initially the same and the error is estimated from the difference in the changes of pressure measured during the measurement periods when the pressure level is initially the same.

32. A method for use in detecting a leak in a pipeline system comprising:
   estimating an error in a measurement of the difference in rate of change of pressures between different pressure levels on a pressurized pipeline system, said estimating including the steps of
      (a) pressurizing said pipeline system to a first pressure level, and measuring changes in pressure in the pipeline system that occur over a first measurement period;
      (b) pressurizing said pipeline system to at least a second pressure level, and measuring changes in pressure in the pipeline system that occur over at least a second measurement period;
      (c) computing a difference in a temperature compensated rate of change of pressure between one pressure level and at least one other pressure level from the measured pressure data at the pressures, including a correction for the thermally induced non-linear changes of pressure between the measurement periods, wherein the difference in the temperature compensated rate of change of pressure between the pressure levels is computed from the rate of change of pressure measured during the measurement periods, said rate of change being a first derivative of the pressure data, and said difference additionally being computed from higher order derivatives of the pressure data; and
      (d) estimating the error by computing at least a next higher order derivative of the pressure data than is used in the computation of difference in rate of change of pressures, and multiplying said next higher order derivative by the time between the measurement periods.

33. A method for use in detecting a leak in a pipeline system comprising:
   measuring the difference in a rate of change of pressure due to a leak between one pressure level and at least one other pressure level, after compensation has been made for thermally induced changes in the pressure of liquid product in a pressurized pipeline system, said measuring including the steps of
      (a) pressurizing said pipeline system to a first pressure level and measuring changes in pressure of product in the pipeline system that occur over a first measurement period;
      (b) pressurizing said pipeline system to a second pressure level and measuring changes in pressure of product in the pipeline system that occur over a second measurement period;
      (c) pressurizing said pipeline system to a third pressure level that is different than the first pressure level and measuring changes in pressure of product in the pipeline system that occur over a third measurement period; and
      (d) computing the difference in temperature compensated rate of change of pressure between a pressure level that is between the second pressure level and the first and third pressure levels, including a correction for the thermally induced non-linear changes of pressure between the measurement periods, wherein the difference in the temperature compensated rate of change of pressure between the pressures is computed by subtracting the time-weighted rate of change of pressure measured during the second measurement period from the time-weighted average of the rate of change of pressure measured during the first and third measurement periods.

34. A method as recited in claim 33 further comprising the step of comparing the difference in temperature compensated rate of change of pressure to a threshold value to determine whether said pipeline system has a leak.

35. A method as recited in claim 33 further comprising correcting for non-linear changes of pressure between measurement periods utilizing higher order derivatives of the pressure data measured during a plurality of the measurement periods.

36. A method as recited in claim 33 further comprising estimating an error in a measurement of the difference in the rate of change of pressure between different pressure levels wherein during the three measurement periods the pressure level is initially the same, and the error is estimated from the difference in the changes of pressure measured during the measurement periods.

37. A method as recited in claim 33 further comprising correcting for non-linear changes of pressure between measurement periods utilizing the second derivative of the pressure data measured during a plurality of the measurement periods.

38. A method as recited in claim 37 wherein said correcting includes using higher order derivatives of the pressure data in addition to the second derivative.

39. A method as recited in claim 33 wherein the pressure level during two sequential measurement periods is approximately equal.

40. A method as recited in claim 33 further comprising estimating an error in a measurement of the difference in rate of change of pressures between different pressure levels wherein during the three measurement periods the pressure level is initially the same, and the error is estimated from the difference in the changes of pressure measured during the measurement periods.

41. A method for use in leak detection in a pipeline system comprising: estimating a systematic bias error due to pressure induced temperature perturbations during measurements of a difference in rate of change of pressures between different pressure levels on a pressurized pipeline system including the steps of (a) pressurizing said pipeline system to a first pressure level, and measuring changes in pressure in the pipeline system that occur over a first measurement period;

(b) pressurizing said pipeline system to at least a second pressure level, and measuring changes in pressure in the pipeline system that occur over at least a second measurement period; and (c) computing the difference in the temperature compensated rate of change of pressure between one pressure and at least one other pressure from the measured pressure data at the pressures, including a correction for the thermally induced non-linear changes of pressure between the measurement periods;

wherein the measurements are conducted when the pressurized pipeline system is known not to be leaking to obtain the systematic bias error for the pressure level, line volume, and liquid at which the measurements are made.

42. A method as recited in claim 41 wherein said estimating further includes adjusting the systematic bias error for differences in pressure levels, line volume capacities, and liquid, said adjusting including the steps of (a) adjusting the systematic bias error between other pressure levels by extrapolating from the measured changes if different pressure levels are used;

(b) adjusting the systematic bias error if the volume capacity of the pipeline system is increased or reduced by extrapolating for the increase of reduction in capacity of the pipeline system; and (c) adjusting the systematic bias error obtained for a first liquid to an estimate for a second liquid when the second liquid is used by extrapolating for the difference in the thermal coefficients of the expansion for the two liquids.

43. A method as recited in claim 41 wherein a time interval between a mid-point of the pressure-level change and a mid-point of the next measurement period is approximately equal for all measurement periods.

44. A method for use in detecting a leak in a pipeline system comprising:

estimating a systematic bias error due to pressure induced temperature perturbations during measurements of a difference in rate of change of pressures between different pressure levels on a pressurized pipeline system, said estimating including the steps of (a) pressurizing said pipeline system to a first pressure level, and measuring changes in pressure of product in the pipeline system that occur over a first measurement period;

(b) pressurizing said pipeline system to at least a second pressure level, and measuring changes in pressure in the pipeline system that occur over at least a second measurement period; and (c) computing the difference in the temperature compensated rate of change of pressure between one pressure level and at least one other pressure level from the measured pressure data at the pressures, including a correction for the thermally induced non-linear changes of pressure between the measurement periods;

wherein the measurements are conducted on at least one pressurized pipeline system that may be different from the one being tested and is known not to be leaking, to obtain the systematic bias error over the range of and for the pressure levels, line volumes, and liquids at which the measurements are made.

45. A method as recited in claim 44 wherein said estimating further includes adjusting the systematic bias error for differences in pressure levels, line volume capacities, and liquid, said adjusting including the steps of (a) adjusting the systematic bias error between other pressure levels by extrapolating from the measured changes if different pressure levels are used;

(b) adjusting the systematic bias error if the volume capacity of the pipeline system is increased or reduced by extrapolating for the increase or reduction in capacity of the pipeline systems; and (c) adjusting the systematic bias error obtained for a first liquid to an estimate for a second liquid when the second liquid is used by extrapolating for the difference in the thermal coefficients of the expansion for the two liquids.

46. A method as recited in claim 44 wherein a time interval between a mid-point of the pressure-level change and a mid-point of the next measurement period is approximately equal for all measurement periods.

47. A method use in detecting a leak in a pipeline system comprising:

estimating a systematic bias error due to pressure induced temperature perturbations during measurements of a difference in rate of change of pressures between different pressure levels on a pressurized pipeline system, said estimating including the steps of (a) pressurizing said pipeline system to a first pressure level, and measuring changes in pressure in the pipeline system that occur over a first measurement period;

(b) pressurizing said pipeline system to at least a second pressure level, and measuring changes in pressure in the pipeline system that occur over at least a second measurement period;

(c) computing the difference in the temperature compensated rate of change of pressure between one pressure level and at least one other pressure level from the measured pressure data at the pressure levels, including a correction for the thermally induced non-linear changes of pressure between the measurement periods, wherein the difference in the temperature compensated rate of change of pressure between the pressures is computed from the rate of change of pressure measured during the measurement periods (first derivative of the pressure data or rate of change of pressure) and higher order derivatives of the pressure data; and (d) using a model to estimate the thermally induced pressure changes that would be measured on a pipeline system without a leak to obtain the systematic bias error for the pressure level, line volume, and liquid at which the model estimates are made.

48. A method as recited in claim 47 wherein said estimating further includes adjusting the systematic bias error for differences in pressure levels, line volume capacities, and liquid, said adjusting including the steps of (a) adjusting the systematic bias error between other pressures by extrapolating from the measured changes, if different pressure levels are used;

(b) adjusting the systematic bias error if the volume capacity of the pipeline system is increased or reduced by extrapolating for the increase or reduction in capacity of the pipeline systems; and (c) adjusting the systematic bias error obtained for a first liquid to an estimate for a second liquid, when the second liquid is used, by extrapolating for the difference in the thermal coefficients of the expansion for the two liquids.

49. A method as recited in claim 47 wherein a time interval between a mid-point of the pressure-level change and a mid-point of the next measurement period is approximately equal for all measurement periods.

50. A method for use in leak detection comprising:

estimating a systematic bias error due to pressure induced temperature perturbations during measurements of a difference in a rate of change of pressures between different pressures on a pressurized pipeline system containing liquid product, said estimating including the steps of (a) changing the pressure level in the pipeline system from a first pressure level to a second pressure level, and measuring changes in pressure in the pipeline system that occur over a first measurement period;

(b) changing the pressure level in the pipeline system from the second pressure level to a third pressure level, the difference between the third pressure level and the second pressure level being approximately equal to the difference between the second pressure level and the first pressure level, and measuring changes in pressure in the pipeline system that occur over a second measurement period;

(c) changing the pressure level in the pipeline system from the third pressure level to approximately the second pressure level, and measuring changes in pressure in the pipeline system that occur over a third measurement period;

(d) computing the difference in temperature compensated rate of change of pressure between the second and third pressure levels during the first and second measurement periods and the third and second pressure levels during the second and third measurement periods, including a correction for the thermally induced non-linear changes of pressure between the measurement periods; and (e) subtracting the second and third pressure levels during the first and second measurement periods from the third and second pressure levels during the second and third measurement periods to obtain the systematic bias error.

51. A method as recited in claim 50 wherein the measurement periods are located at approximately equal intervals in time from the pressure-level changes.

52. A method as recited in claim 50 wherein the measurement periods are of approximately equal duration.

53. A method as recited in claim 50 wherein the measurement periods are located at approximately equal intervals in time from the pressure-level changes, and the measurement periods are of approximately equal duration.

54. A method for use in leak detection comprising:

estimating an error in a measurement of a difference in rate of change of pressures between different pressure levels in a pipeline system, said estimating including the steps of (a) pressurizing said pipeline system to a first pressure level and measuring changes in pressure in the pipeline system that occur over a first measurement period;

(b) pressurizing said pipeline system to at least a second pressure level and measuring changes in pressure in the pipeline system that occur over at least a second measurement period;

(c) computing the difference in the temperature compensated rate of change of pressure between one pressure level and at least one other pressure level from the measured pressure data at the pressure levels including a correction for the thermally induced non-linear changes of pressure between the measurement periods;

(d) computing the difference between the second derivatives of the pressure data during two measurement periods; and (e) estimating the error as a percentage of the difference obtained in (d).

55. A method as recited in claim 54 further comprising the step of comparing the error to a threshold error value, and repeating the preceding steps if the threshold error value is exceeded.

* * * * *